(12) United States Patent
Wang et al.

(10) Patent No.: US 12,743,858 B2
(45) Date of Patent: Sep. 22, 2026

(54) VIRTUAL-ENVIRONMENT-BASED INTERACTION METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Shuai Wang, Shenzhen (CN); Jianquan Li, Shenzhen (CN); Xiaofeng Chen, Shenzhen (CN); Qiwen Zheng, Shenzhen (CN); Shuang Hao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

(21) Appl. No.: 18/215,222

(22) Filed: Jun. 28, 2023

(65) Prior Publication Data

US 2023/0343054 A1 Oct. 26, 2023

Related U.S. Application Data

(63) Continuation of application No. PCT/CN2022/135238, filed on Nov. 30, 2022.

(30) Foreign Application Priority Data

Mar. 1, 2022 (CN) ......................... 202210193345.8

(51) Int. Cl.
*G06T 19/20* (2011.01)
*G06F 3/14* (2006.01)

(52) U.S. Cl.
CPC ................ *G06T 19/20* (2013.01); *G06F 3/14* (2013.01); *A63F 2300/5553* (2013.01); *G06T 2219/2024* (2013.01)

(58) Field of Classification Search
CPC ............... G06T 19/20; A63F 2300/555; A63F 2300/5553
See application file for complete search history.

(56) References Cited

U.S. PATENT DOCUMENTS 6,476,830 B1 * 11/2002 Farmer .............. G06Q 30/0641 715/977
8,260,728 B1 * 9/2012 Walsh ..................... A63F 13/69 706/45

(Continued)

FOREIGN PATENT DOCUMENTS

CN 111589128 A 8/2020
CN 111672112 A 9/2020

(Continued)

OTHER PUBLICATIONS

International Search Report with Written Opinion issued Feb. 20, 2023 in Application No. PCT/CN2022/135238. (9 pages).

(Continued)

*Primary Examiner* — Chante E Harrison
(74) *Attorney, Agent, or Firm* — ARENTFOX SCHIFF LLP

(57) ABSTRACT

In a method for displaying an interactive element, a first virtual object and the interactive element are displayed in a virtual scene. A user input for the first virtual object to interact with the interactive element in the virtual scene is received. Based on an interaction with the interactive element by the first virtual object, the display of the interactive element is controlled to change to a target form according to a target item of the first virtual object.

20 Claims, 14 Drawing Sheets

(56) References Cited

U.S. PATENT DOCUMENTS

| | | | | |
|---|---|---|---|---|
| 2010/0169798 | A1* | 7/2010 | Hyndman | A63F 13/30 715/757 |
| 2013/0083011 | A1* | 4/2013 | Geisner | G06F 3/013 345/419 |
| 2021/0279930 | A1* | 9/2021 | Hutten | G06T 11/00 |
| 2021/0279962 | A1* | 9/2021 | Hutten | G06T 19/006 |
| 2022/0383601 | A1* | 12/2022 | Evangelista | G06T 19/20 |
| 2024/0087272 | A1* | 3/2024 | Benzies | A63F 13/52 |

FOREIGN PATENT DOCUMENTS

| | | | | |
|---|---|---|---|---|
| CN | 113680060 | A | 11/2021 | |
| CN | 119158263 | A * | 12/2024 | |
| EP | 3383036 | A2 * | 10/2018 | G11B 27/031 |
| WO | WO-2023165191 | A1 * | 9/2023 | A63F 13/31 |

OTHER PUBLICATIONS

Office Action received for Japanese Patent Application No. 2024-531476, mailed on Oct. 14, 2025, 12 pages (7 pages of English Translation and 5 pages of Original Document).

Super Famico, "[Super Famicom Masterpiece] Super Famicom Wars (2P SFC Version) Map 1 "So Ramamejima" Strategy", YouTube, Available online at: <https://www.youtube.com/watch?v=S3NjV9ZKms0>, Aug. 21, 2019, 7 pages (Official copy only).

Super Famicom Chandu, "[SFC/Waterfall Cave ~ Ending] Mystery Dungeon 2: Shiren the Wanderer", YouTube, Available online at: <https://www.youtube.com/watch?v=tAdbke1ZYnl>, Apr. 24, 2021, 9 pages (Official copy only).

* cited by examiner

A

B

C

1501
Display module
1502
Control module

1601
Receiving module
1602
Determining module
1603
Transmission module
1604
Refresh module 1701
Display module
1702
Control module

VIRTUAL-ENVIRONMENT-BASED INTERACTION METHOD AND APPARATUS, DEVICE, MEDIUM, AND PROGRAM PRODUCT

RELATED APPLICATIONS

The present application is a continuation of International Application No. PCT/CN2022/135238 filed on Nov. 30, 2022, which claims priority to Chinese Patent Application No. 202210193345.8, entitled "VIRTUAL-ENVIRONMENT-BASED INTERACTION METHOD AND APPARATUS, DEVICE, MEDIUM, AND PROGRAM PRODUCT" and filed on Mar. 1, 2022. The entire disclosures of the prior applications are hereby incorporated by reference.

FIELD OF THE TECHNOLOGY

Embodiments of this disclosure relate to the field of virtual environments, including to a virtual-environment-based interaction method and apparatus, a device, a medium, and a program product.

BACKGROUND OF THE DISCLOSURE

In the field of games, a virtual environment is usually constructed by using a plurality of scene elements. The scene elements include a stone, a tree, a house, a non-player character (NPC), and the like.

In the related art, an interaction manner between a game character controlled by a player and the scene element is single. For example, in an acquisition task, the player controls the game character to get close to the tree, and clicks a picking button to successfully obtain a fruit in the tree. In a forging task, the player controls the game character to provide a raw material such as a rare metal for a forging furnace, and clicks a forging button to obtain a successfully forged weapon.

In the related art, the interaction manner between the scene element (the tree and the forging furnace) and the game character is single. How to enrich the interaction manner between the scene element and the game character becomes a technical problem urgent to be solved.

SUMMARY

This disclosure provides a virtual-environment-based interaction method and apparatus, a device, a medium, and a program product. In an example, a new interaction manner between an environmental virtual object and a first virtual object can be provided, thereby helping increase an interaction rate between a player and the environmental virtual object.

According to an aspect of this disclosure, a method for displaying an interactive element is provided. The method is performed by a client device, for example. In the method for displaying the interactive element, a first virtual object and the interactive element are displayed in a virtual scene. A user input for the first virtual object to interact with the interactive element in the virtual scene is received. Based on an interaction with the interactive element by the first virtual object, the display of the interactive element is controlled to change to a target form according to a target item of the first virtual object.

According to another aspect of this disclosure, a method for displaying an interactive element is provided. The method is performed by a server, for example. In the method, an interaction request of a first virtual object with an interactive element in a virtual scene is received from a client device. The interaction request includes item information of a target item of the first virtual object. Based on the item information of the target item, a target form of the interactive element that corresponds to the item information is determined. Target form information that indicates the determined target form of the interactive element to be displayed by the client device is sent to the client device.

According to another aspect of this disclosure, an information processing apparatus is provided. The information processing apparatus includes processing circuitry that is configured to display a first virtual object and the interactive element in a virtual scene. The processing circuitry is configured to receive a user input for the first virtual object to interact with the interactive element in the virtual scene. The processing circuitry is configured to control, based on an interaction with the interactive element by the first virtual object, the display of the interactive element to change to a target form according to a target item of the first virtual object.

According to another aspect of this disclosure, an information processing apparatus is provided. The information processing apparatus includes processing circuitry that is configured to receive an interaction request of a first virtual object with an interactive element in a virtual scene from a client device. The interaction request includes item information of a target item of the first virtual object. The processing circuitry is configured to determine, based on the item information of the target item, a target form of the interactive element that corresponds to the item information. The processing circuitry is configured to send, to the client device, target form information that indicates the determined target form of the interactive element to be displayed by the client device.

According to another aspect of this disclosure, a computer device is provided. The computer device includes a processor and a memory. The memory stores a computer program. The computer program is loaded and executed by the processor to enable the computer device to implement the methods as described above.

According to another aspect of this disclosure, a non-transitory computer-readable storage medium is provided. The non-transitory computer-readable storage medium stores a computer program. The computer program is loaded and executed by a processor to enable a computer to implement the methods as described above.

According to another aspect of this disclosure, a computer program product is provided. The computer program product includes computer instructions. The computer instructions are stored in a non-volatile computer-readable storage medium. A processor of a computer device reads the computer instructions from the non-volatile computer-readable storage medium. The processor executes the computer instructions to enable the computer device to perform the methods provided in the foregoing aspects.

A new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, a display form of the environmental virtual object is highly correlated with a skin that the first virtual object is fitted with. This can improve interaction experience of a player, thereby increasing an interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an "Easter egg", and the environmental virtual object actively displays the target form to the first virtual object based on the target skin that the first virtual object is fitted with.

DESCRIPTION OF EMBODIMENTS

Figure 1:
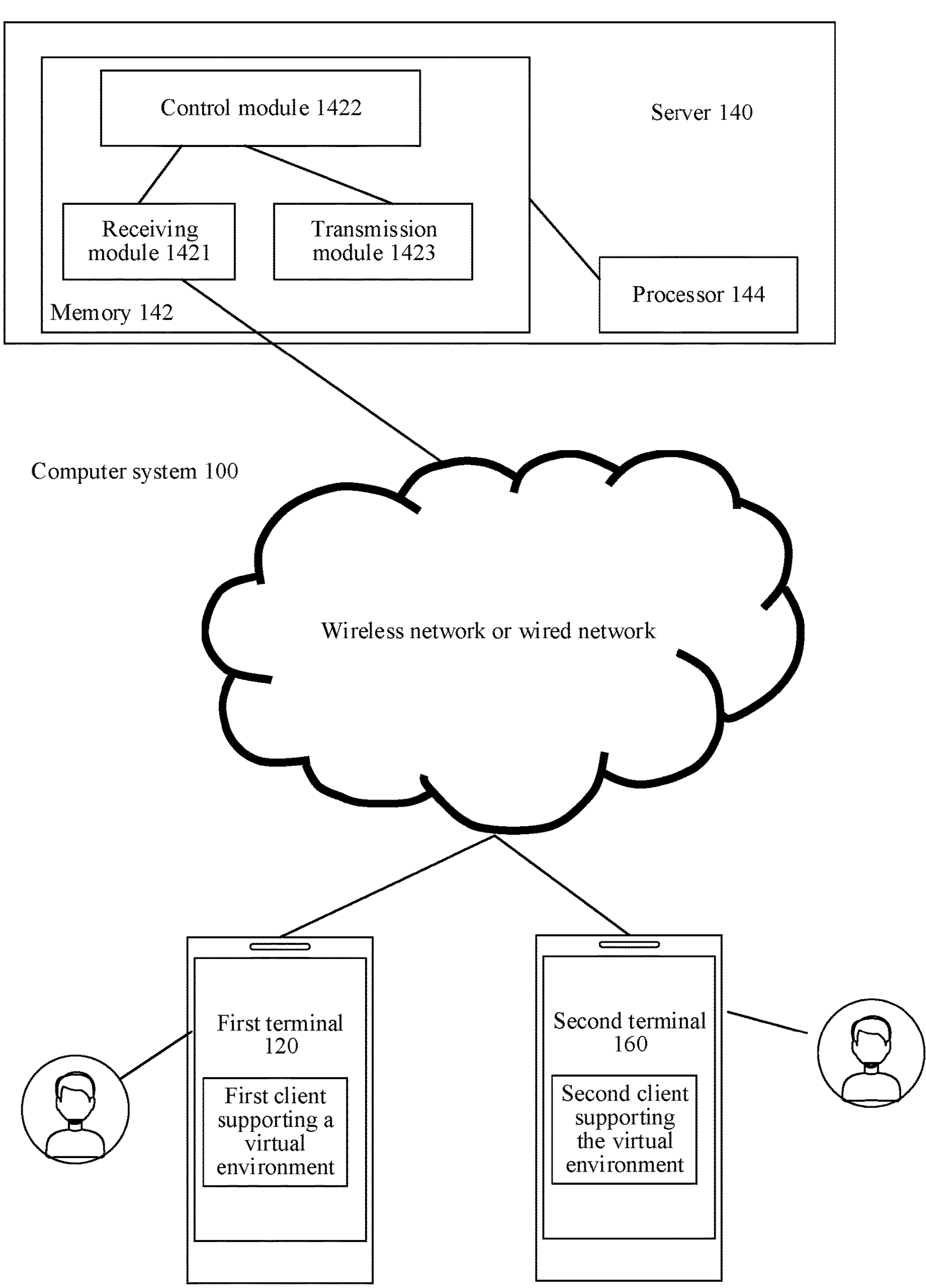
FIG. 1 is a block diagram of a structure of a computer system according to an exemplary embodiment.

Exemplary embodiments will now be described in detail, examples of which are represented in the drawings. When the following description involves the accompanying drawings, unless otherwise indicated, the same numerals in different accompanying drawings represent the same or similar elements. Implementations described in the following exemplary embodiments do not represent all implementations consistent with this disclosure. Instead, the implementations are merely examples of apparatuses and methods that are consistent with some aspects of this disclosure.

"A plurality of" mentioned herein means one or more, and "multiple" means two or more. "And/or" describes an association between associated objects and represents that three relationships may exist. For example, A and/or B may represent three cases: only A exists, both A and B exist, and only B exists. The character "/" generally indicates an "or" relationship between the associated objects.

First, terms involved in the embodiments of this disclosure are briefly described.

Virtual environment includes a virtual environment displayed (or provided) when a client is run on a terminal. The virtual environment may be a simulated environment of a real world, a semi-simulated semi-fictional environment, or an entirely fictional environment. The virtual environment may be any one of a two-dimensional virtual environment, a 2.5-dimensional virtual environment, and a three-dimensional virtual environment. This is not limited in this disclosure. An example in which the virtual environment is a three-dimensional virtual environment is used for description in the following embodiments.

The virtual environment may provide a battle environment of a virtual object. For example, in an escape game, at least one virtual object is engaged in a battle in the virtual environment. The virtual object survives in the virtual environment by evading an attack of an enemy and a danger (for example, a blue circle or a marshland) in the virtual environment. When a health value of a virtual object in the virtual environment is 0, the virtual object dies in the virtual environment. A virtual object that survives at last is a winner.

FIG. 1 is a block diagram of a structure of a computer system according to an exemplary embodiment of this disclosure. The computer system 100 includes a first terminal 120, a server 140, and a second terminal 160.

A first client supporting a virtual environment is installed and run in the first terminal 120. A control account for a first virtual object logs in to the first client. The first client may be any one of a three-dimensional map program, horizontal shooting, horizontal adventure, horizontal stage clearing, horizontal strategy, a virtual reality (VR) application program, and an augmented reality (AR) program. The first terminal 120 is a terminal used by a first user. The first user uses the first terminal 120 to control a movement of the first virtual object in the virtual environment. The movement includes but is not limited to at least one of adjusting a body posture, walking, running, jumping, riding, driving, aiming, and picking up and using a thrown prop. For example, the first virtual object is a virtual person, for example, a simulated person object or a cartoon character object. For example, the first user controls the movement of the first virtual object by using a user interface (UI) control on a picture of the virtual environment.

A second client supporting the virtual environment is installed and run in the second terminal 160. A control account for a second virtual object logs in to the second client. The second client may be any one of a three-dimensional map program, horizontal shooting, horizontal adventure, horizontal stage clearing, horizontal strategy, a VR application program, and an AR program. The second terminal 160 is a terminal used by a second user. The second user uses the second terminal 160 to control a movement of the second virtual object in the virtual environment.

The first terminal 120 is connected to the server 140 through a wireless network or a wired network. The second terminal 160 is connected to the server 140 through the wireless network or the wired network.

The server 140 includes at least one of one server, a plurality of servers, a cloud computing platform, and a virtual center. For example, the server 140 includes a processor 144 and a memory 142. The memory 142 further includes a receiving module 1421, a control module 1422, and a transmission module 1423. The receiving module 1421 is configured to receive a request transmitted by a client, for example, a request of controlling a virtual object to move. The control module 1422 is configured to control rendering of the picture of the virtual environment. The transmission module 1423 is configured to transmit a response to the client, for example, transmitting, to the client, a response that a location of the virtual object has changed. The server 140 is configured to provide a background service for an application program supporting the virtual environment. In an example, the server 140 undertakes primary computing work, and the first terminal 120 and the second terminal 160 undertake secondary computing work. Alternatively, the server 140 undertakes secondary computing work, and the first terminal 120 and the second terminal 160 undertake primary computing work. Alternatively, the server 140, the first terminal 120, and the second terminal 160 collaboratively undertake computing work. For example, the application program supporting the virtual environment may also be referred to as a client supporting the virtual environment, for example, the foregoing first client and second client.

The client may be run on different operating system platforms (Android or iOS). In an example, a device type of the terminal includes at least one of a smartphone, a smartwatch, a vehicle-mounted terminal, a wearable device, a smart television, a tablet computer, an e-book reader, a moving picture experts group audio layer III (MP3) player, a moving picture experts group audio layer IV (MP4) player, a laptop computer, and a desktop computer. An example in which the terminal includes a smartphone is used as an example for description in the following embodiments.

It may be learned by a person skilled in the art that there may be more or fewer terminals. For example, there may be only one terminal, or there are dozens of, hundreds of or more terminals. The quantity and the device type of the terminal are not limited in the embodiments of this disclosure.

Figure 2:
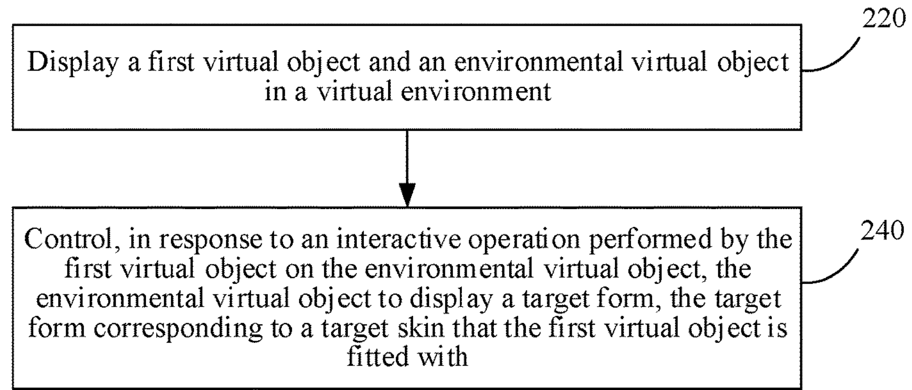
FIG. 2 is a flowchart of a virtual-environment-based interaction method according to an exemplary embodiment.

FIG. 2 is a flowchart of a virtual-environment-based interaction method according to an exemplary embodiment of this disclosure. A new interaction manner is provided for an environmental virtual object and a first virtual object. An example in which the method is performed by the first terminal 120 shown in FIG. 1 (or a first client that is run on the first terminal 120 and that supports a virtual environment) is used for description in this embodiment. The first client is a client configured to control the first virtual object. This method includes the following steps:

Step 220: Display the first virtual object and the environmental virtual object in the virtual environment.

The first virtual object is a movable object that is controlled by the first client and that is in the virtual environment. The movable object may be a virtual person, a virtual animal, a cartoon character, or the like, for example, a person or an animal displayed in the three-dimensional virtual environment. In an example, a virtual object is a three-dimensional model created based on a skeletal animation technology. Each virtual object has a shape and a size in the three-dimensional virtual environment, and occupies some space in the three-dimensional virtual environment.

In this disclosure, a target skin is a skin that the first virtual object is fitted with. At an interface level, the skin may be simply understood as an appearance of the first virtual object. At a background technology level, the skin may be understood as a map of a model of the first virtual object. In this disclosure, the target skin may be a first-layer skin on an original model, or may be a second-layer skin obtained by improving a first-layer skin. For example, the first-layer skin is obtained by rendering a first map, and the second-layer skin is obtained by rendering a second map obtained by changing some parts of the first map. In this disclosure, skin information of the target skin includes at least one of the following: a skin level of the target skin in a target skin series to which the target skin belongs, skins in the target skin series being of a same basic skin style; rarity of the target skin; skin quality of the target skin; a skin theme of the target skin; a body part of the first virtual object covered by the target skin; a skin accessory of the target skin; a skin attribute of the target skin; and a quantity of skin accessories of the target skin. In some embodiments, the rarity may also be referred to as a rarity degree.

In some embodiments, the first client displays the first virtual object fitted with the target skin. The target skin of the first virtual object may be a skin that the first virtual object has, or may be a skin that the first virtual object is temporarily fitted with based on a skin experience permission. Skin experience duration may be three days, five days, seven days, or longer or shorter duration.

The target skin that the first virtual object is fitted with may be replaced in a current battle or selected before a battle is started. For example, the first client may control the first virtual object to pick up and put on clothes discarded by another virtual object, and display a picture in which the first virtual object is fitted with the clothes. For example, in a multiplayer online battle arena (MOBA) game, the first client may select the target skin to fit the first virtual object before a battle is started, and control the first virtual object is fitted with the skin in an entire battle process.

The environmental virtual object is a scene element that the virtual environment has. In an example, the scene element includes a dynamic virtual object and a static virtual object. The dynamic virtual object is a movable object that is not controlled by a player and that is in the virtual environment, for example, an owner of a virtual shop who is greeting a customer, a pedestrian walking freely on a street, or a game guide distributing a mission. The static virtual object is an unmovable scene element in the virtual environment, for example, a calligraphy and painting pendant in a study, a pond in a yard, or trees all around. A life bar may be set for the dynamic virtual object, and a wear degree may be set for the static virtual object. The dynamic virtual object may be created by simulating a living animal in a real world, and the static virtual object may be created by simulating a non-living item in the real world. In an example, the dynamic virtual object and the static virtual object are both used for constructing a scene of the virtual environment.

Figure 3:
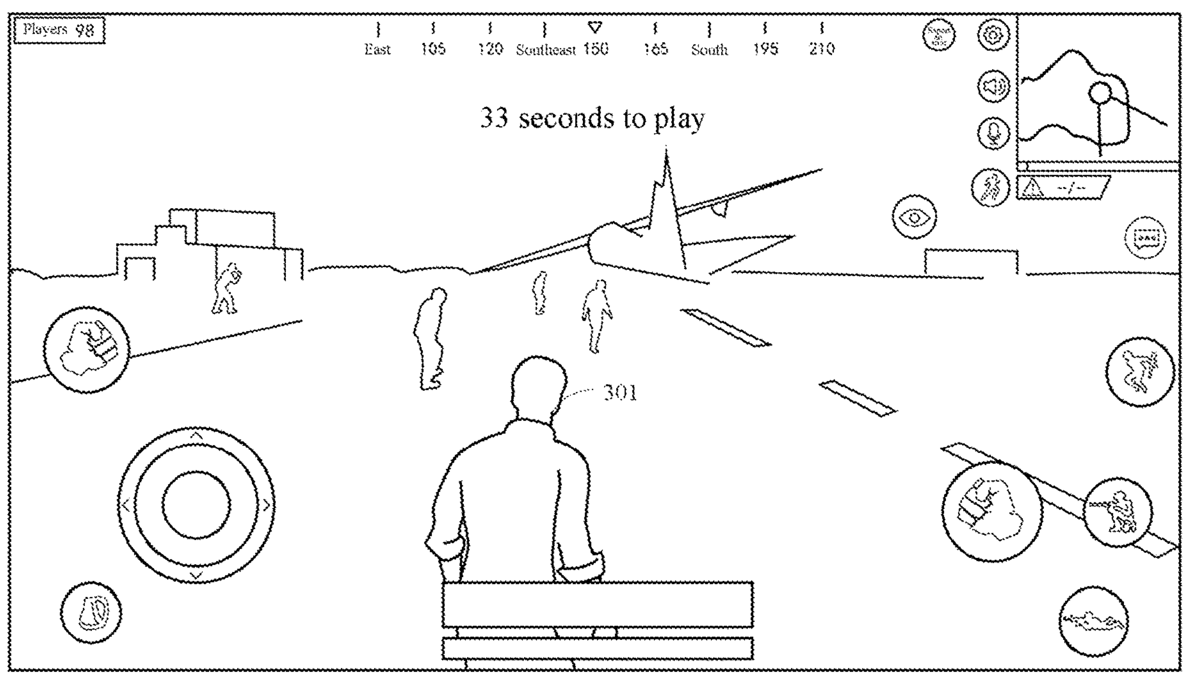
FIG. 3 is a schematic diagram of a virtual environment according to an exemplary embodiment.

FIG. 3 shows a virtual environment observed from the prospective of a first virtual object 301. The virtual environment may be observed from the third-person prospective, for example. In this case, a camera model in the virtual environment is behind the first virtual object 301. In an open world type game, the virtual environment shown in FIG. 3 is a picture of a birth island before a battle is started. The birth island is used for gathering all players participating in the battle. When gathering duration reaches a duration threshold, or a quantity of players reaches a player quantity threshold, the battle is started.

Figure 4:
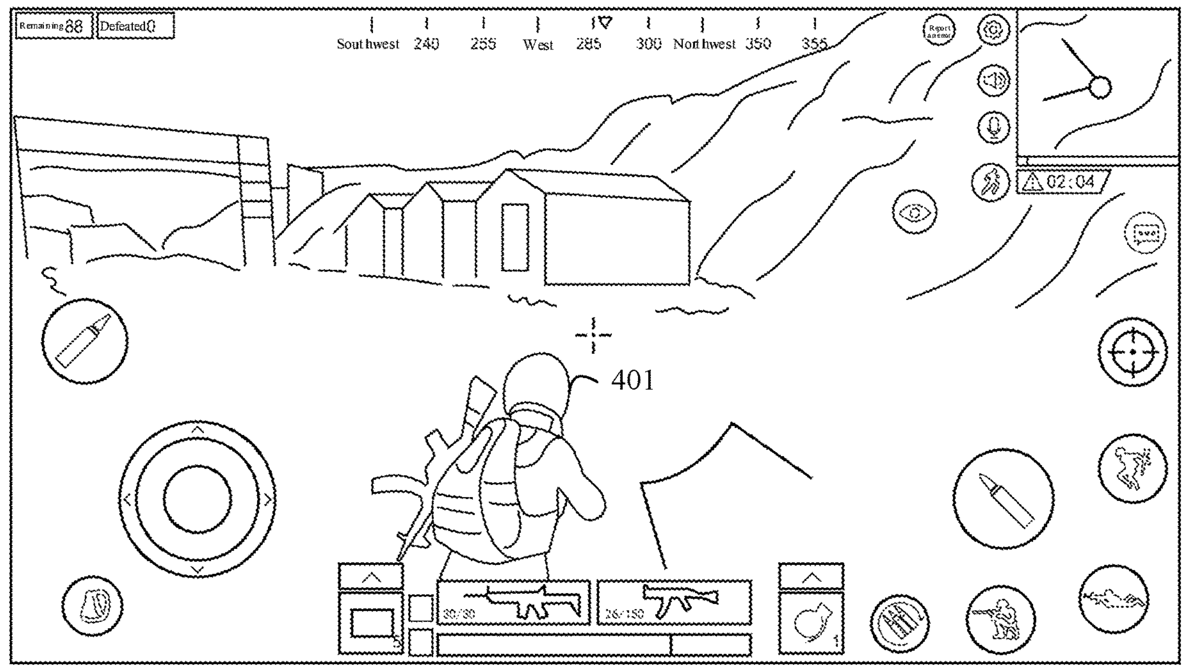
FIG. 4 is a schematic diagram of a virtual environment according to another exemplary embodiment.

FIG. 4 shows a virtual environment observed from the prospective of a first virtual object 401. In an open world type game, the virtual environment shown in FIG. 4 is a picture in a battle process. The virtual environment shown in FIG. 4 is constructed by using a house (a scene element) and a slope (a scene element).

In some embodiments, the scene element may be represented in at least two forms. For example, the scene element is a "tree", and the "tree" is divided into two forms based on a quantity of leaves. For example, the scene element is a "fish tank", and the "fish tank" is divided into two forms based on a quantity of goldfish in the fish tank. For example, the scene element is a "cluster of flowers", and the "cluster of flowers" is divided into two forms based on a quantity of blooming flowers in the cluster of flowers.

In some embodiments, the first client displays the scene element in an original form, that is, displays the environmental virtual object in the original form. The original form is a basic form of the environmental virtual object. The original form may be set based on a type of the environmental virtual object, or may be flexibly adjusted based on a running condition of the first client. This is not limited in this embodiment of this disclosure. For example, the scene element is a "tree", and the original form is a "dead tree", that is, there are no leaves on the tree. For example, the scene element is a "fish tank", and the original form is that there are no goldfish in the fish tank. For example, the scene element is a "cluster of flowers", and the original form is that flowers in the cluster of flowers are all closed.

Step 240: Control, in response to an interactive operation performed by the first virtual object on the environmental virtual object, the environmental virtual object to display a target form, the target form corresponding to the target skin that the first virtual object is fitted with.

The interactive operation is an operation that the first client controls the first virtual object to interact with the environmental virtual object. In an example, the interactive operation is a trigger operation of a user received by the first client. For example, an interaction control is displayed on an interface of the first client. The first client obtains, in response to the trigger operation performed by the user on the interaction control, the interactive operation performed by the first virtual object on the environmental virtual object. Then, the first client controls, in response to the interactive operation, the environmental virtual object to display the target form. The trigger operation may be any one of a click operation, a drag operation, a double-click operation, a touch-and-hold operation, and a force touch operation. In an example, the interactive operation is that the first virtual object hits the environmental virtual object by casting a skill. For example, the first client controls the first virtual object to cast the skill to the environmental virtual object. The skill hits the environmental virtual object. The first client obtains the interactive operation performed by the first virtual object on the environmental virtual object. Then, the first client controls, in response to the interactive operation, the environmental virtual object to display the target form.

The interactive operation may be automatically performed when the first virtual object and the environmental virtual object satisfy a specific relationship. For example, a distance between the first virtual object and the environmental virtual object is less than a distance threshold. The first client obtains the interactive operation performed by the first virtual object on the environmental virtual object. Then, the first client controls, in response to the interactive operation, the environmental virtual object to display the target form.

Figure 5:
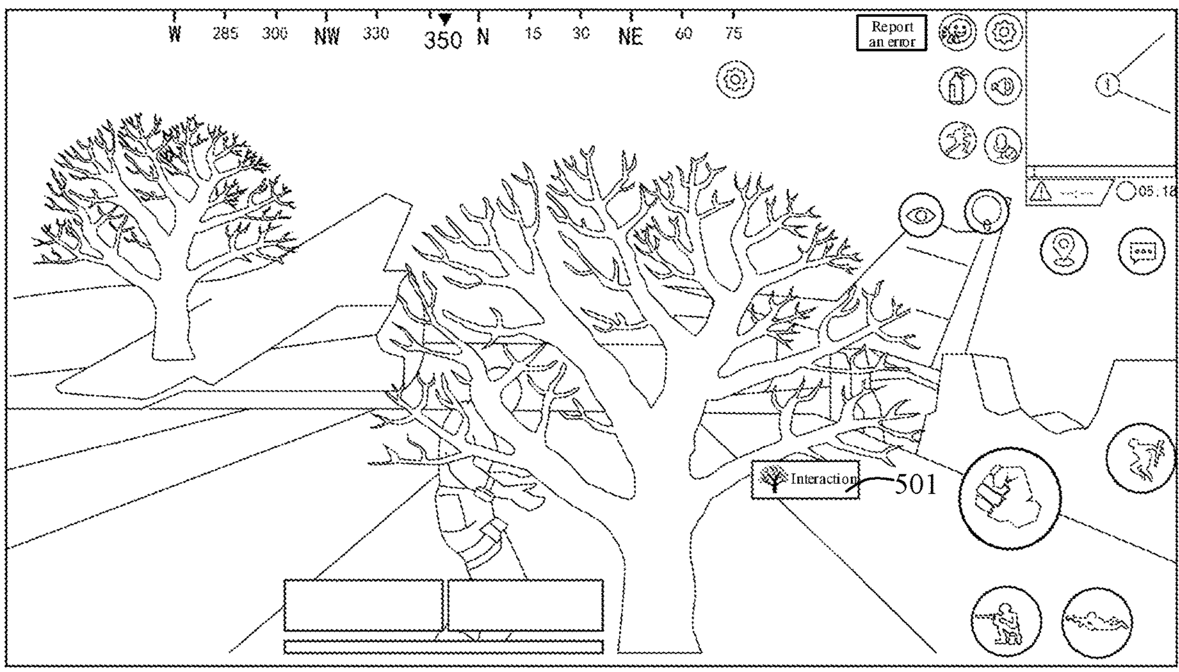
FIG. 5 is a schematic diagram of an interaction control configured to control a first virtual object to interact with an environmental virtual object according to an exemplary embodiment.

In an example, FIG. 5 shows the interaction control configured to control the first virtual object to interact with the environmental virtual object. In response to that the first client controls the first virtual object to move to the environmental virtual object (a tree), when the first virtual object enters a reference distance range of the "tree", an interaction control 501 is displayed on the first client. In response to that the interaction control 501 receives the trigger operation, the first client controls the environmental virtual object to display the target form.

In this disclosure, the target form is a form that is displayed by the environmental virtual object and that corresponds to the target skin that the first virtual object is fitted with. For example, when the first virtual object is fitted with a first skin, the first client controls the environmental virtual object to display a first form corresponding to the first skin. When the first virtual object is fitted with a second skin, the first client controls the environmental virtual object to display a second form corresponding to the second skin. The first skin and the second skin are different skins. The first form and the second form are different forms of the environmental virtual object. The environmental virtual object displays different forms when the first virtual object is fitted with different skins. This can achieve an effect that a form displayed by the environmental virtual object changes in real time as a skin that the first virtual object is fitted with changes, improve a correlation between the form of the environmental virtual object and the skin that the first virtual object is fitted with, and help improve interaction experience of the player, thereby increasing an interaction rate between the player and the environmental virtual object.

In an embodiment, the environmental virtual object is cloud. When the first virtual object is fitted with the first skin, the cloud is displayed by using a white map with high transparency. When the first virtual object is fitted with the second skin, the cloud is displayed by using a golden map with low transparency. The first skin and the second skin are different skins. Specific related discussions about that the first skin corresponds to the first form and the second skin corresponds to the second form will be made in the following embodiments.

In an embodiment, the first client displays, by playing a first dynamic special effect, a form change process in which the original form of the environmental virtual object is switched to the target form and then the target form is switched to the original form. Such a dynamic special effect presents a more prominent visual effect, which helps further attract the attention of the player and improve the interaction experience of the player, thereby increasing the interaction rate between the player and the environmental virtual object.

In an example, the scene element is a "tree", the original form is a "dead tree", that is, there are no leaves on the tree, and the target form is a tree with leaves of a first density. In this case, the first client switches the “dead tree” to the tree with the leaves of the first density, and then switches the tree with the leaves of the first density to the “dead tree”. The first density is set by experience or flexibly adjusted based on an application scenario. For a same tree, if the first density is higher, there are more leaves on the tree.

In an embodiment, the environmental virtual object includes all or some environmental virtual objects within a reference distance range of the first virtual object. The reference distance range corresponds to the target skin that the first virtual object is fitted with. The reference distance range may be flexibly adjusted based on the target skin. When the target skin changes, the reference distance range may change or remain unchanged.

In an example, the environmental virtual object includes environmental virtual objects in all environmental virtual objects within the reference distance range of the first virtual object, n being an integer not less than 1. In an example, a numerical value of n is fixed. Alternatively, a numerical value of n corresponds to the target skin that the first virtual object is fitted with. For example, all the environmental virtual objects are “stone 1, stone 2, tree 1, tree 2, a wall, and a house”, and the n environmental virtual objects are four environmental virtual objects “stone 1, stone 2, tree 1, and tree 2”.

In an example, the environmental virtual object includes n types of environmental virtual objects in all environmental virtual objects within the reference distance range of the first virtual object, n being an integer not less than 1. In an example, a numerical value of n is fixed. Alternatively, a numerical value of n corresponds to the target skin that the first virtual object is fitted with. For example, “stone 1, stone 2, tree 1, tree 2, a wall, and a house” are all the environmental virtual objects, and the n types of environmental virtual objects include four types of environmental virtual objects “the stones, the trees, the wall, and the house”. Correspondingly, all the environmental virtual objects (the six environmental virtual objects) display target forms.

In an example, the first client randomly determines the n environmental virtual objects in all the environmental virtual objects, n being an integer not less than 1.

In an example, the interactive operation acts on at least one of all or some environmental virtual objects. The all or some environmental virtual objects display target forms in response to the interactive operation.

In summary, a new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, the display form of the environmental virtual object is highly correlated with the skin that the first virtual object is fitted with. This can improve interaction experience of the player, thereby increasing the interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an “Easter egg”, and the environmental virtual object actively displays the target form to the first virtual object based on the target skin that the first virtual object is fitted with.

The environmental virtual object is set to display the original form when not interacting with the virtual object controlled by the player and display the target form when interacting with the virtual object fitted with the target skin. This ensures dependence of different forms displayed by virtual objects controlled by different players. That is, when virtual objects controlled by a plurality of players interact with the environmental virtual object in turn, the environmental virtual object always uses the original form as a transitional form, and a client of any player displays a change process from the original form to the target form and then to the original form. The form of the environmental virtual object has a prominent visual effect, which helps further attract the attention of the player and improve the interaction experience of the player, thereby increasing the interaction rate between the player and the environmental virtual object.

In addition, the environmental virtual object displays different forms when the first virtual object is fitted with different skins. This can achieve the effect that the form displayed by the environmental virtual object changes in real time as the skin that the first virtual object is fitted with changes, improve the correlation between the form of the environmental virtual object and the skin that the first virtual object is fitted with, and help improve the interaction experience of the player, thereby increasing the interaction rate between the player and the environmental virtual object.

In an embodiment based on FIG. 2, that “the first skin corresponds to the first form and the second skin corresponds to the second form” in step 240 includes at least one of the following eight cases.

1: The first skin and the second skin are skins of different levels of a same skin series. Skins in the same skin series are of a same basic skin style. A level of the first skin is lower than that of the second skin. Fineness of the first form is lower than that of the second form.

Figure 6:
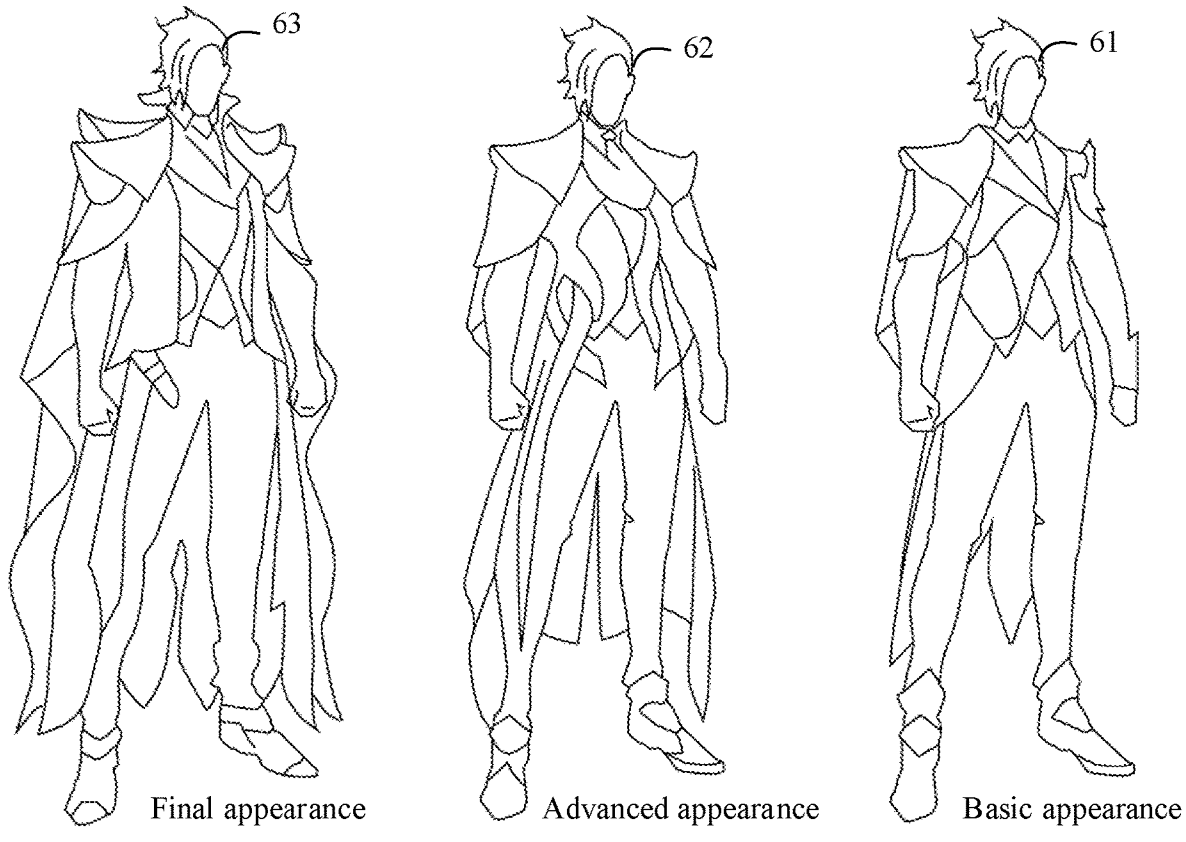
FIG. 6 is a schematic diagram of skins of three different levels of a same skin series according to an exemplary embodiment.

In an example, FIG. 6 shows skins of three different levels of a same skin series. A level of a skin 61 is lower than that of a skin 62. The level of the skin 62 is lower than that of a skin 63. With reference to FIG. 6, the skin 61, the skin 62, and the skin 63 are of a same basic skin style.

Figure 7:
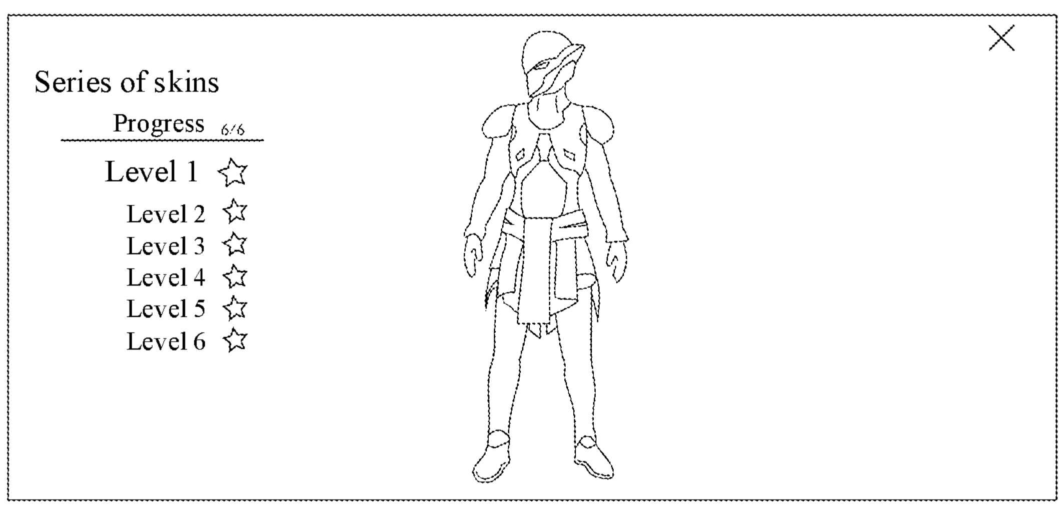
FIG. 7 is a schematic diagram of skins of three different levels of a same skin series according to another exemplary embodiment.
Figure 7:
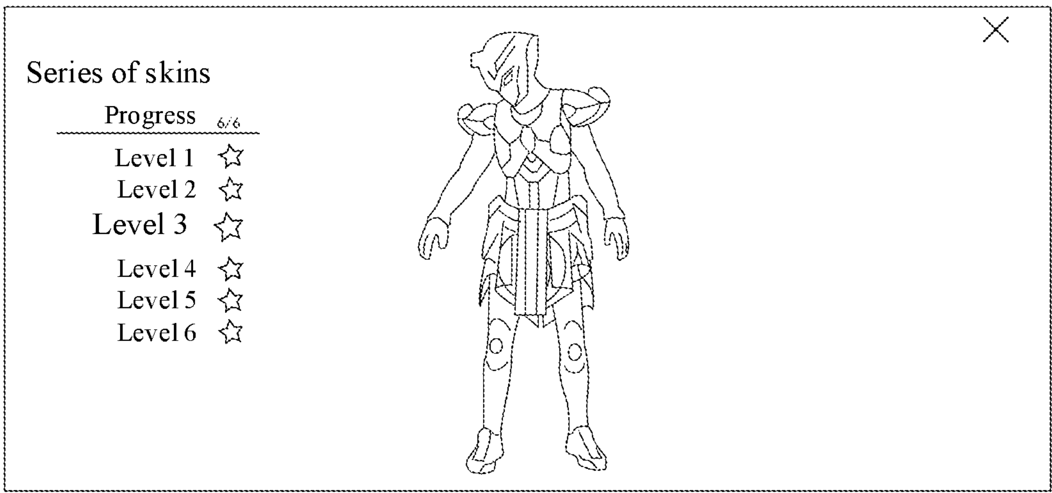
Figure 7:
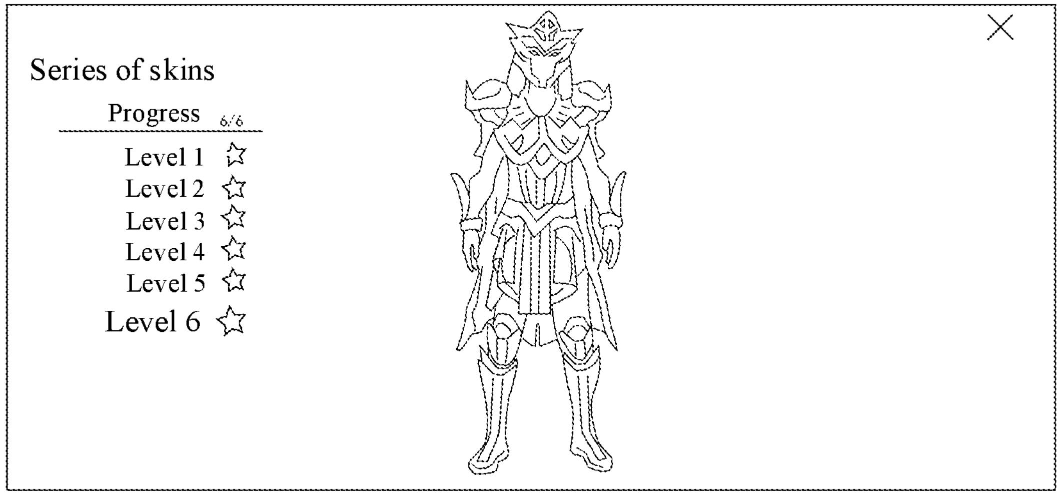

Then, FIG. 7 shows skins of three different levels of another skin series. Part (A) in FIG. 7 shows a skin of a level 1. Part (B) in FIG. 7 shows a skin of a level 3. Part (C) in FIG. 7 shows a skin of a level 6. It can be seen from FIG. 7 that skins of this series are of a same basic skin style.

In an embodiment, the environmental virtual object is a “tree”. A form of the “tree” corresponding to the skin of the level 1 is leaves of the first density. A form of the “tree” corresponding to the skin of the level 3 is leaves of second density. A form of the “tree” corresponding to the skin of the level 6 is leaves of a third density. The first density is lower than the second density. The second density is lower than the third density. A density of leaves may be regarded as fineness of the form of the “tree”. That is, fineness of the form of the “tree” corresponding to the skin of the level 1 is lower than that of the form of the “tree” corresponding to the skin of the level 3. The fineness of the form of the “tree” corresponding to the skin of the level 3 is lower than that of the form of the “tree” corresponding to the skin of the level 6.

The fineness may be understood as richness of details on a map of the environmental virtual object. For example, the environmental virtual object is a tree, and if there are more leaves on the tree, fineness is higher. For example, the environmental virtual object is an NPC, and if there are more textures on clothes on the NPC, fineness is higher.

The fineness may alternatively be understood as gorgeousness of the environmental virtual object. For example, the environmental virtual object is cloud. Gorgeousness of a map of the cloud is obtained by coordinating a saturation, a contrast, and sharpness of the map. The gorgeousness of the map of the cloud may be adjusted based on chrominance and luminance of a pixel of the map. Higher gorgeousness provides the player an intuitive feeling that the cloud is more beautiful. The gorgeousness may be measured by using a special effect of the form of the environmental virtual object. If the form has more special effects, the gorgeousness is higher.

2: The first skin and the second skin are different in rarity. Rarity of the first skin is lower than that of the second skin. Fineness of the first form is lower than that of the second form.

The rarity may be understood as a difficulty level for obtaining the skin. For example, in some games, a color is used to correspond to rarity. For example, rarity of a white skin, a blue skin, a yellow skin, a purple skin, an orange skin, and a red skin gradually increases. The white skin and the blue skin are skins provided by a game server for players for free. The yellow skin and the purple skin may be obtained only after the player collects a material to perform skin upgrade. The orange skin and the red skin may also be obtained through upgrade, but correspondingly with a higher upgrade failure rate. A skin of any rarity may be directly purchased after top-up.

In some games, the rarity may be represented by normal (N), rare (R), super rare (SR), superior super rare (SSR), and ultra rare (UR&UTR).

Figure 8:
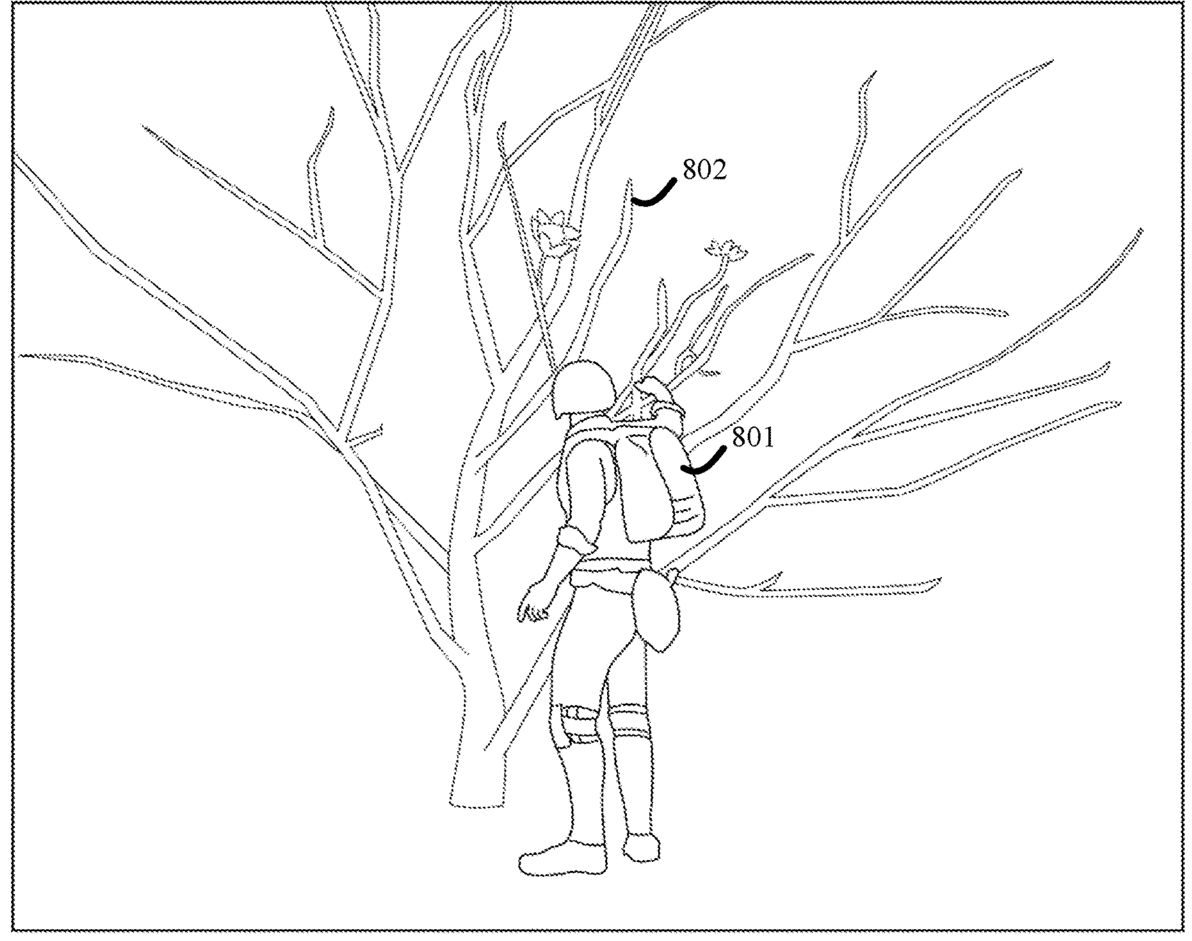
FIG. 8 is a schematic diagram of displaying a first form corresponding to a first skin by an environmental virtual object according to an exemplary embodiment.
Figure 9:
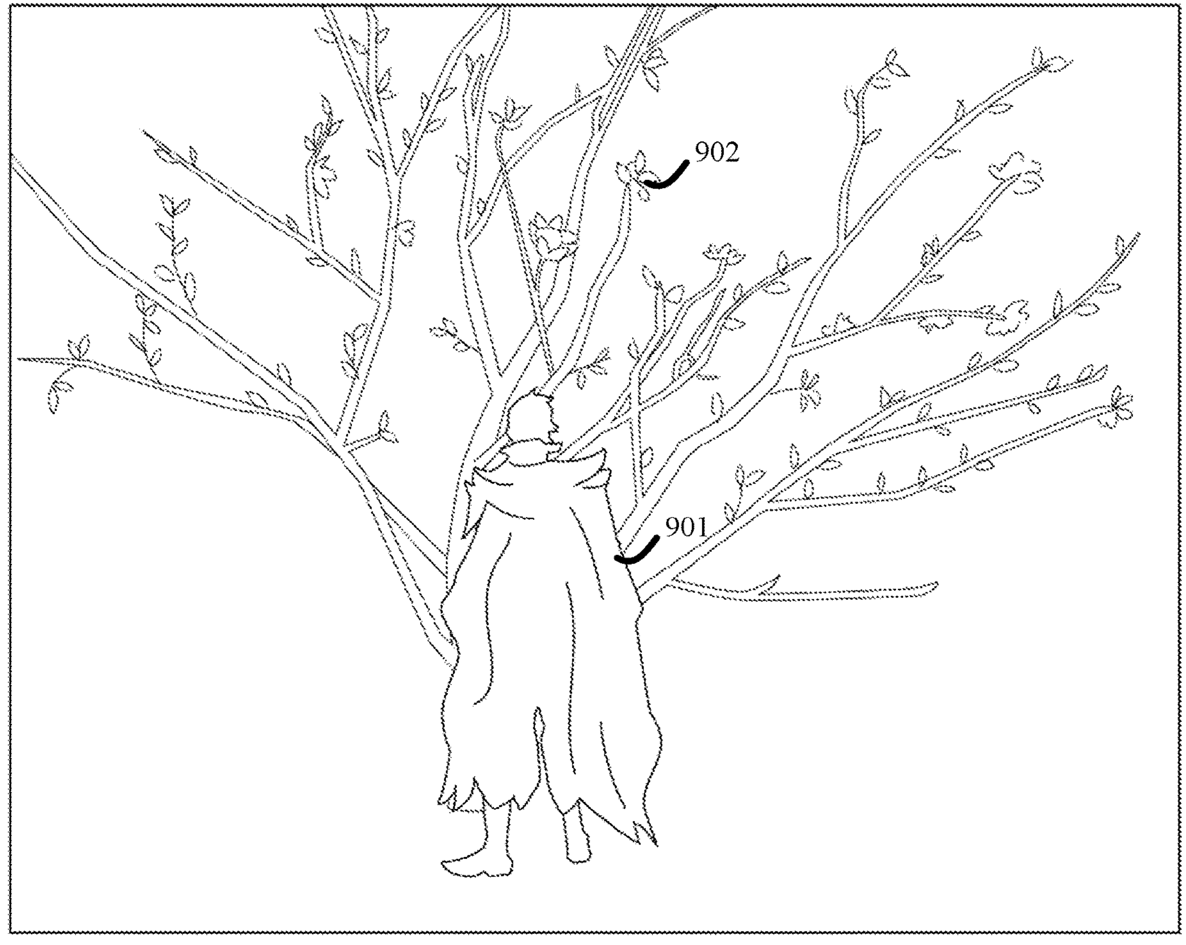
FIG. 9 is a schematic diagram of displaying a second form corresponding to a second skin by an environmental virtual object according to an exemplary embodiment.

Refer to FIG. 8 and FIG. 9. FIG. 8 shows that the environmental virtual object displays the first form corresponding to the first skin. FIG. 9 shows that the environmental virtual object displays the second form corresponding to the second skin. Rarity of a first skin 801 that the first virtual object is fitted with in FIG. 8 is lower than that of a second skin 901 that the first virtual object is fitted with in FIG. 9. Fineness of a first form 802 of the tree in FIG. 8 is lower than that of a second form 902 of the tree in FIG. 9. That is, a quantity of leaves of the "tree" in the first form 802 is less than that of leaves of the "tree" in the second form 902.

3: The first skin and the second skin are different in skin quality. Skin quality of the first skin is lower than that of the second skin. Fineness of the first form is lower than that of the second form.

The skin quality may be understood as an aesthetic degree of the skin. In some games, the skin quality is classified into a free skin, an accompanying skin, a gallant skin, an epic skin, a legend skin, and a collector skin. An aesthetic degree of a skin with higher skin quality is higher. Based on this, there may also be a limited skin, a season skin, or other skin quality.

In an embodiment, if the skin quality is higher, the fineness of the form of the environmental virtual object is higher. For example, the environmental virtual object is a "pond", quality of the gallant skin is lower than that of the legend skin, and fineness of a form of the "pond" may be reflected by using quantities of lotus leaves and lotus flowers in the pond. In this case, quantities of lotus leaves and lotus flowers in the pond corresponding to the gallant skin are less than those of lotus leaves and lotus flowers in the pond corresponding to the legend skin.

4: The first skin and the second skin belong to different skin themes. The first skin belongs to a first skin theme. The second skin belongs to a second skin theme. A style of the first form corresponds to the first skin theme. A style of the second form corresponds to the second skin theme.

In an embodiment, all skins under a same skin theme have a same story background. For example, all skins under a theme of the "three kingdoms" have elements of the "three kingdoms". For example, a "Guan Yu" skin has elements of a red face and beards, and a "Zhang Fei" skin has an element of stubble on the face. All skins under a "Christmas" theme have "Christmas" elements. A skin has an element of a Christmas tree, and another skin has an element of Father Christmas.

For example, the first skin belongs to the theme of the "three kingdoms", and the second skin belongs to the "Christmas" theme. The environmental virtual object is an "NPC". A first form of the NPC is a soldier dressed in an ancient style. A second form of the NPC is Father Christmas. That is, the style of the first form corresponds to the first skin theme, and the style of the second form corresponds to the second skin theme.

5: The first skin and the second skin cover different body parts of the first virtual object. A body part of the first virtual object covered by the first skin is a first body part. A body part of the first virtual object covered by the second skin is a second body part. The first form includes that fineness of a first body part of the environmental virtual object is higher than that of a body part other than the first body part. The second form includes that fineness of a second body part of the environmental virtual object is higher than that of a body part other than the second body part.

In an embodiment, the environmental virtual object and the first virtual object have similar body parts. For example, the first virtual object and the environmental virtual object are both simulated person objects, and both include the following body parts: a head, a torso, and four limbs. The first skin and the second skin do not completely cover the torso of the first virtual object. For example, the first skin is used for covering the head of the first virtual object, and the second skin is used for covering the torso of the first virtual object. In this case, the first form indicates that fineness of the head of the environmental virtual object is higher than that of the other body parts, and the second form indicates that fineness of the torso of the environmental virtual object is higher than that of the other body parts.

In some games, a skin is obtained by assembling skin accessories. For example, a complete skin includes a hat, a coat, trousers, and an ornament. In some games, the first skin includes only the coat, and the second skin includes only the trousers. That is, the first skin and the second skin are sub skins of the complete skin.

In some games, the first skin and the second skin are referred to as "star-coin skins". Some forms of an original skin are changed to obtain the first skin and the second skin. For example, a hat accessory of the original skin is replaced, or a coat accessory of the original skin is replaced.

6: The first skin and the second skin have different skin accessories. The first skin has a first skin accessory. The second skin has a second skin accessory. The first form includes that the first skin accessory is displayed on the environmental virtual object. The second form includes that the second skin accessory is displayed on the environmental virtual object.

For example, the first skin has the first skin accessory that the second skin does not have, and the second skin has the second skin accessory that the first skin does not have.

Controlling the environmental virtual object to display the first form means displaying the first skin accessory on the environmental virtual object. Controlling the environmental virtual object to display the second form means displaying the second skin accessory on the environmental virtual object.

In an embodiment, the first skin has a skin accessory "hat" that the second skin does not have, and the second skin has a skin accessory "ornament☆" that the first skin does not have. In this case, the first form indicates that the "hat" is displayed on the environmental virtual object, and the second form indicates that the "ornament☆" is displayed on the environmental virtual object.

7: The first skin and the second skin have different skin attributes. The first form includes that the environmental virtual object has a display element corresponding to a skin attribute of the first skin. The second form includes that the environmental virtual object has a display element corresponding to a skin attribute of the second skin.

In an embodiment, the skin attribute includes any one of metal, wood, water, fire, earth, wind, thunder, and lightning. In an example, the attribute of the first skin is water, the attribute of the second skin is fire, and the environmental virtual object is a "tree". In this case, the first form may be a tree displaying a totem of the Azure Dragon, and the second form may be a burning tree.

In an embodiment, the skin attribute includes any one of the Azure Dragon, the White Tiger, the Vermilion Bird, and the Black Tortoise. In an example, the skin attribute of the first skin is the Azure Dragon, the skin attribute of the second skin is the Vermilion Bird, and the environmental virtual object is a "tree". In this case, the first form may be a tree displaying a totem of the Azure Dragon, and the second form may be a tree displaying a totem of the Vermilion Bird.

8: Quantities of skin accessories of the first skin and the second skin are different. The quantity of skin accessories of the first skin is less than that of skin accessories of the second skin. Fineness of the first form is lower than that of the second form, and/or, display duration of the first form is less than that of the second form.

For example, that the quantities of skin accessories of the first skin and the second skin are different means that the first skin and the second skin have same skin accessories, but quantities of the skin accessories that the first skin and the second skin have are different.

In an example, the first skin displays long dress with five jewels, the second skin displays a long dress with eight jewels, and the environmental virtual object is a "marriage tree" in a game. A density of the marriage tree displayed in the first form is lower than that of the marriage tree displayed in the second form, and/or, duration in which the first skin correspondingly displays the first form of the marriage tree is less than duration in which the second skin correspondingly displays the second form of the marriage tree.

In summary, in the eight possible implementations of that "the first skin corresponds to the first form and the second skin corresponds to the second form", correspondences between different skins and different forms are set thereby providing a new interaction manner for the environmental virtual object and the first virtual object. The eight possible implementations of that "the first skin corresponds to the first form and the second skin corresponds to the second form" are merely examples, and are not intended to limit the embodiments of this disclosure.

It is to be noted that the "first skin" and the "second skin" are interchangeable in some embodiments. When the "first skin" and the "second skin" are interchanged, "first form" and the "second form" are also interchanged. For example, in the first of the eight cases, if the "first skin" and the "second skin" are interchanged, the level of the first skin is higher than that of the second skin, and the fineness of the first form is higher than that of the second form. In the second of the eight cases, if the "first skin" and the "second skin" are interchanged, the rarity of the first skin is higher than that of the second skin, and the fineness of the first form is higher than that of the second form. In the third of the eight cases, if the "first skin" and the "second skin" are interchanged, the skin quality of the first skin is higher than that of the second skin, and the fineness of the first form is higher than that of the second form. In the eighth of the eight cases, if the "first skin" and the "second skin" are interchanged, the quantity of skin accessories of the first skin is more than that of skin accessories of the second skin; and the fineness of the first form is higher than that of the second form, and/or, the display duration of the first form is more than that of the second form.

Possibilities of the first skin and the second skin are varied, so that possibilities of the first form and the second form are varied. The environmental virtual object is set to implement different forms, so that the virtual environment has a variety of scene elements. Therefore, an overall aesthetic degree of the virtual environment is improved, and the overall interestingness and playability of the game are indirectly improved.

The following describes content of a background technology, to describe a process in which a computer system implements the operation of "controlling the environmental virtual object to display a target form".

Figure 10:
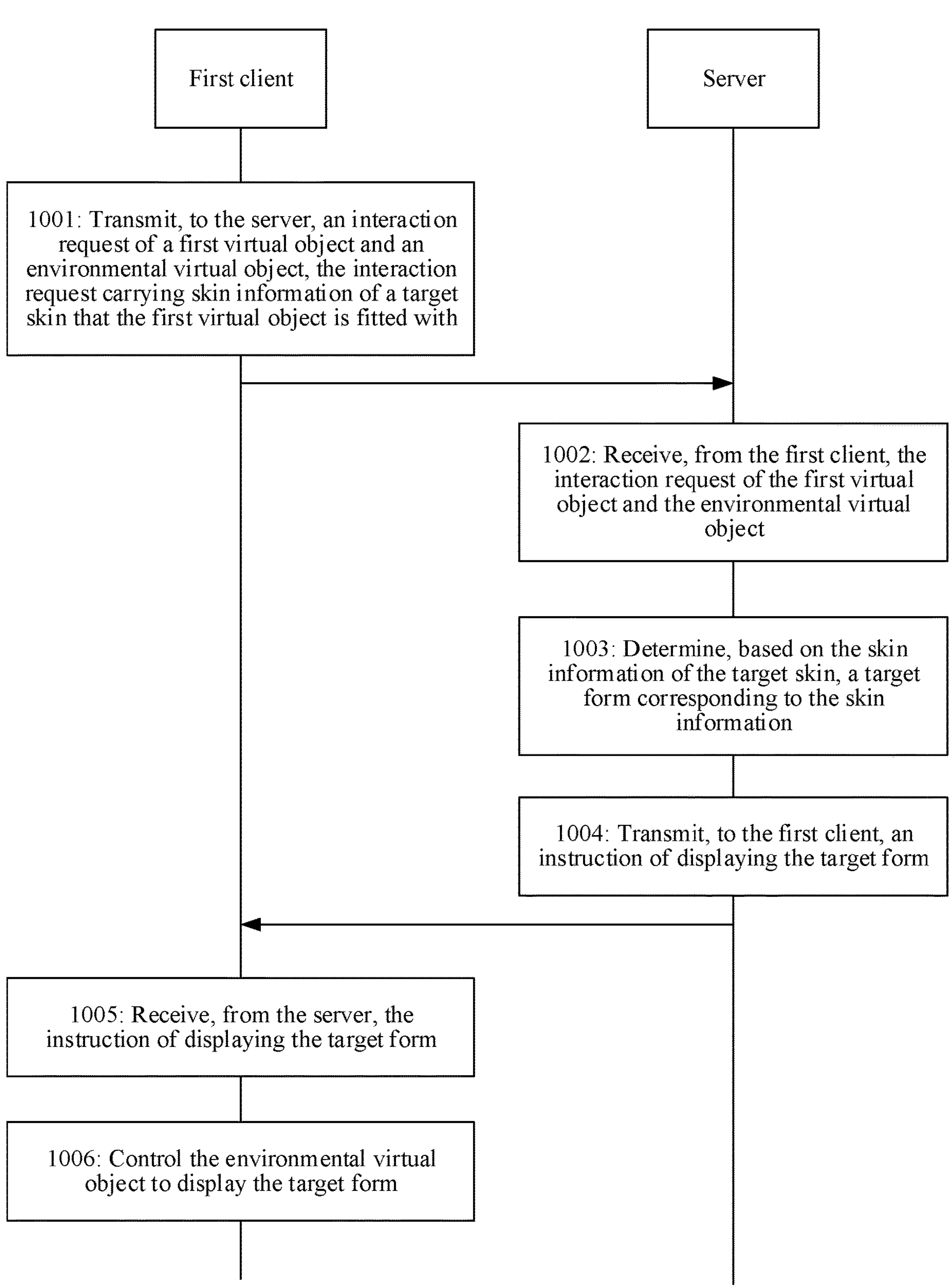
FIG. 10 is a schematic diagram of an interaction process of a computer system according to an exemplary embodiment.

FIG. 10 is a schematic diagram of an interaction process of a computer system according to an exemplary embodiment of this disclosure. The interaction process includes the following steps:

Step 1001: A first client transmits, to a server, an interaction request of a first virtual object and an environmental virtual object, the interaction request carrying skin information of a target skin that the first virtual object is fitted with.

The first client transmits, to the server in response to an interactive operation performed by the first virtual object on the environmental virtual object, the interaction request of the first virtual object and the environmental virtual object.

In an embodiment, the environmental virtual object displays an original form at an initial moment. The environmental virtual object displays a target form in response to the interactive operation performed by the first virtual object on the environmental virtual object. Then, the environmental virtual object displays the original form in response to that display duration of the target form reaches a threshold, until a next virtual object interacts with the environmental virtual object.

In an embodiment, the environmental virtual object displays a first form at an initial moment. The environmental virtual object displays a second form in response to the interactive operation performed by the first virtual object fitted with a second skin on the environmental virtual object. When another virtual object fitted with a third skin interacts with the environmental virtual object, the environmental virtual object displays a third form.

Step 1002: The server receives, from the first client, the interaction request of the first virtual object and the environmental virtual object.

The interaction request is generated based on the interactive operation performed by the first virtual object on the environmental virtual object and the skin information of the target skin that the first virtual object is fitted with.

Step 1003: The server determines, based on the skin information of the target skin, the target form corresponding to the skin information.

The server obtains the skin information of the target skin that the first virtual object is fitted with in the interaction request, and determines, based on the skin information of the target skin, the target form corresponding to the skin information.

In an embodiment, the skin information includes at least one of the following: a skin level of the target skin in a target skin series to which the target skin belongs, skins in the target skin series being of a same basic skin style; rarity of the target skin; skin quality of the target skin; a skin theme of the target skin; a body part of the first virtual object covered by the target skin; a skin accessory of the target skin; a skin attribute of the target skin; and a quantity of skin accessories of the target skin.

In this disclosure, the target form is a form that is displayed by the environmental virtual object and that corresponds to the target skin that the first virtual object is fitted with.

For example, the server stores a correspondence between skin information and a form, and then may search the correspondence for a form corresponding to the skin information of the target skin, and determine the found form as the target form.

For example, the target skin includes a first skin or the second skin. The first skin and the second skin are skins of different levels in the same skin series. The server determines the skin series that the target skin belongs to, the level of the target skin in the skin series, and the target form corresponding to the skin series and the level.

For example, the target skin includes a first skin or the second skin. The first skin and the second skin are different in rarity. The server determines the rarity of the target skin and the target form corresponding to the rarity.

For example, the target skin includes a first skin or the second skin. The first skin and the second skin are different in skin quality. The server determines the skin quality of the target skin and the target form corresponding to the skin quality.

For example, the target skin includes a first skin or the second skin. The first skin and the second skin belong to different skin themes. The server determines the skin theme that the target skin belongs to and the target form corresponding to the skin theme.

For example, the target skin includes a first skin or the second skin. The first skin and the second skin cover different body parts of the first virtual object. The server determines the body part of the first virtual object covered by the target skin and the target form corresponding to the body part.

For example, the target skin includes a first skin or the second skin. The first skin and the second skin have different skin accessories. The server determines the skin accessory of the target skin and the target form corresponding to the skin accessory.

For example, the target skin includes a first skin or the second skin. The first skin and the second skin have different skin attributes. The server determines the skin attribute of the target skin and the target form corresponding to the skin attribute.

For example, the target skin includes a first skin or the second skin. Quantities of skin accessories of the first skin and the second skin are different. The server determines the quantity of skin accessories of the target skin and the target form corresponding to the quantity.

Step 1004: The server transmits, to the first client, an instruction of displaying the target form.

The server transmits, to the first client, the instruction of controlling the environmental virtual object to display the target form.

Step 1005: The first client receives, from the server, the instruction of displaying the target form.

Step 1006: The first client controls the environmental virtual object to display the target form.

The first client selects the target form from a preloaded form library of the environmental virtual object, and displays the target form on the environmental virtual object. The form library may be preloaded from the server before a current battle is started, or may be downloaded from the server and stored locally when the first client is installed.

In the method embodiment shown in FIG. 10, the target form may be only displayed on the first client and not synchronously updated to another client, or may be synchronously updated to all clients corresponding to all virtual objects in a current virtual environment.

In summary, a manner in which the first client displays the target form is provided based on the interaction process between the first client and the sever, and a correspondence process of the target skin and the target form is implemented at the server. This avoids a case that a player allows, by using a bug, the first client to still display the target form in a case that the first virtual object is not fitted with the target skin. Therefore, interaction fairness of players is improved, interaction experience of the player is further improved, and an interaction rate between the player and the environmental virtual object is increased.

Figure 11:
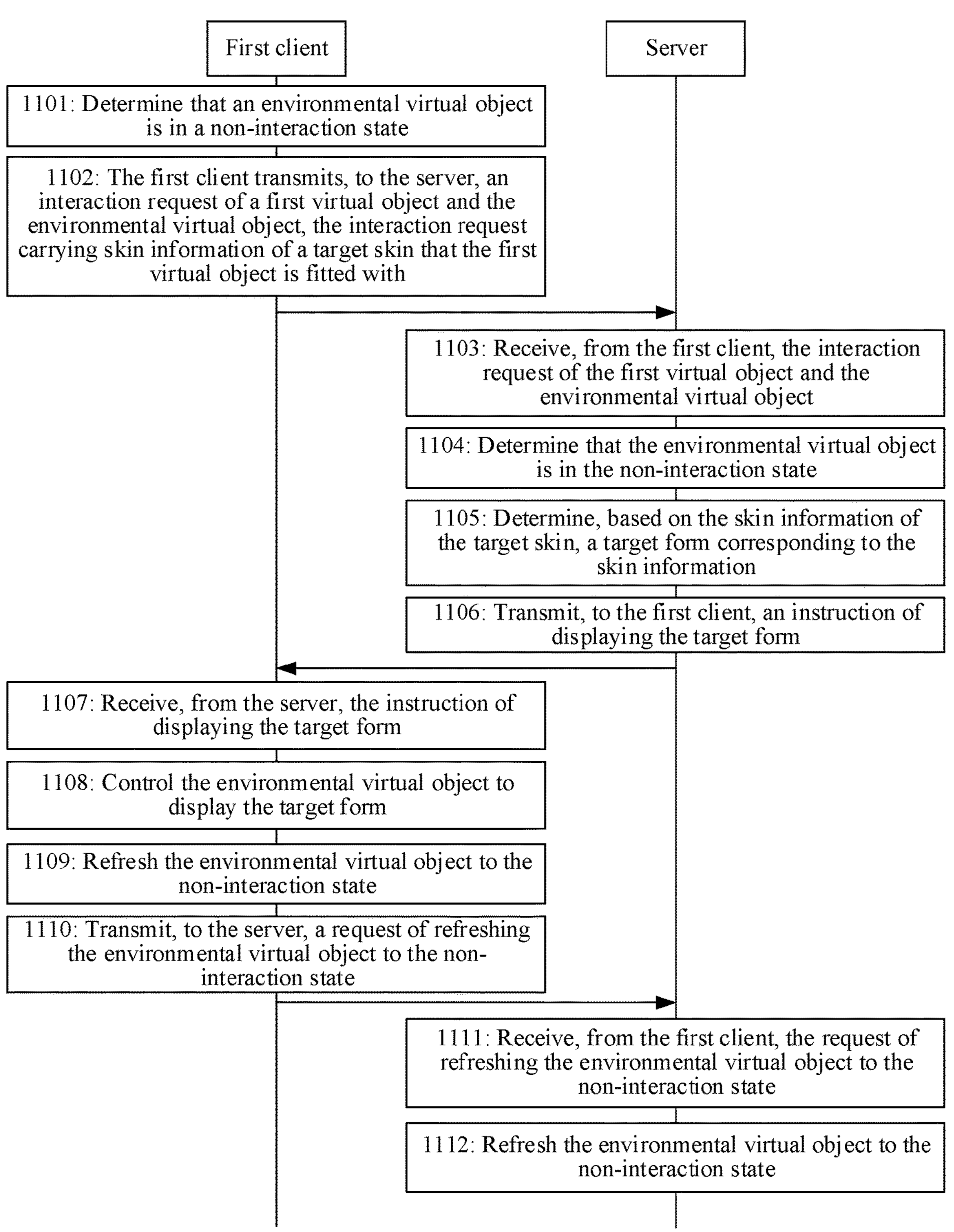
FIG. 11 is a schematic diagram of an interaction process of a computer system according to an exemplary embodiment.

FIG. 11 is a schematic diagram of an interaction process of a computer system according to another exemplary embodiment of this disclosure. The interaction process includes the following steps:

Step 1101: A first client determines that an environmental virtual object is in a non-interaction state.

The non-interaction state indicates that the environmental virtual object currently does not interact with a virtual object. The non-interaction state may also be referred to as an unused state. Every time when refreshing a status of the environmental virtual object, the first client needs to synchronously update a refreshed status to a server.

The first client determines, in response to that the first client receives an interactive operation performed by a first virtual object on the environmental virtual object, that the environmental virtual object is currently in the non-interaction state.

Step 1102: The first client transmits, to the server, an interaction request of the first virtual object and the environmental virtual object, the interaction request carrying skin information of a target skin that the first virtual object is fitted with.

The first client transmits, to the server in response to that the first client determines that the environmental virtual object is currently in the non-interaction state, the interaction request of the first virtual object and the environmental virtual object.

Step 1103: The server receives, from the first client, the interaction request of the first virtual object and the environmental virtual object.

Step 1104: The server determines that the environmental virtual object is in the non-interaction state.

The server rechecks whether the environmental virtual object is in the non-interaction state. If the environmental virtual object is in the non-interaction state, the server performs step 1105.

Step 1105: The server determines, based on the skin information of the target skin, a target form corresponding to the skin information.

The server obtains the skin information of the target skin that the first virtual object is fitted with in the interaction request, and determines, based on the skin information of the target skin, the target form corresponding to the skin information.

Specifically refer to step 1003.

Step 1106: The server transmits, to the first client, an instruction of displaying the target form.

The server transmits, to the first client, the instruction of controlling the environmental virtual object to display the target form.

Step 1107: The first client receives, from the server, the instruction of displaying the target form.

Step 1108: The first client controls the environmental virtual object to display the target form.

In an example, the first client controls the environmental virtual object to display the target form, and updates the environmental virtual object to an interacting state.

Step 1109: The first client refreshes the environmental virtual object to the non-interaction state.

In an embodiment, the first client displays, by playing a first dynamic special effect, a form change process in which an original form of the environmental virtual object is switched to the target form and then the target form is switched to the original form. After completing playing the first dynamic special effect, the first client refreshes the environmental virtual object to the non-interaction state.

Step 1110: The first client transmits, to the server, a request of refreshing the environmental virtual object to the non-interaction state.

Step 1111: The server receives, from the first client, the request of refreshing the environmental virtual object to the non-interaction state.

Step 1112: The server refreshes the environmental virtual object to the non-interaction state.

In summary, it is set that the first client and the server need to synchronously update an interaction state of the environmental virtual object. This ensures that the environmental virtual object allows a virtual object controlled by only one player to interact with the environmental virtual object at the same time, and further ensures that a plurality of clients may synchronously display the target form. Therefore, a display error caused by the fact that a plurality of players control virtual objects to interact with a same environmental virtual object at the same time may be avoided, display correctness of a form of the environmental virtual object may be improved, interaction experience of the player may be improved, and an interaction rate between the player and the environmental virtual object may be further improved.

Figure 12:
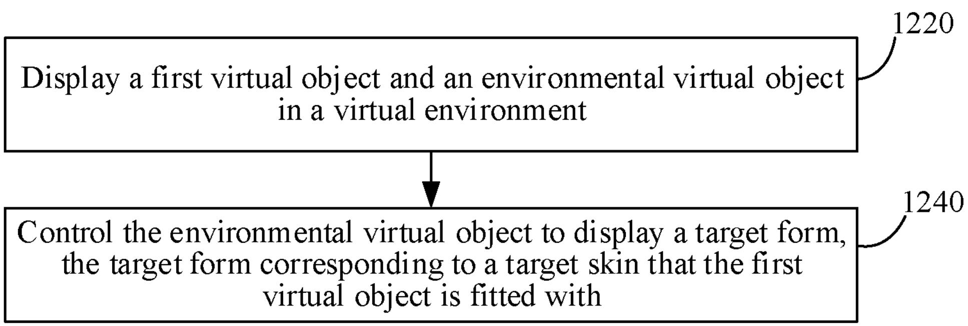
FIG. 12 is a flowchart of a virtual-environment-based interaction method according to another exemplary embodiment.

In an embodiment, FIG. 12 is a flowchart of a virtual-environment-based interaction method according to an exemplary embodiment of this disclosure. An example in which the method is performed by the second terminal 160 shown in FIG. 1 (or a second client that is run on the second terminal 160 and that supports a virtual environment) is used for description. The second client is a client configured to control a second virtual object. The second virtual object is any virtual object other than a first virtual object in the virtual environment. This method includes the following steps:

Step 1220: Display the first virtual object and an environmental virtual object in the virtual environment.

The first virtual object is a movable object that is controlled by a first client and that is in the virtual environment. The environmental virtual object is a scene element that the virtual environment has. The scene element is used for constructing a scene of the virtual environment. For example, the scene element includes a plant, an animal, cloud, a pond, a fish tank, a painting, clothes, an NPC, and the like in the virtual environment.

In some embodiments, the scene element may be represented in at least two forms. For example, the scene element is a "tree", and the "tree" is divided into two forms based on a quantity of leaves. For example, the scene element is a "fish tank", and the "fish tank" is divided into two forms based on a quantity of goldfish in the fish tank. For example, the scene element is a "cluster of flowers", and the "cluster of flowers" is divided into two forms based on a quantity of blooming flowers in the cluster of flowers.

In some embodiments, the second client displays the scene element in an original form, that is, displays the environmental virtual object in the original form. The original form is a basic form of the environmental virtual object. For example, the scene element is a "tree", and the original form is a "dead tree", that is, there are no leaves on the tree. For example, the scene element is a "fish tank", and the original form is that there are no goldfish in the fish tank. For example, the scene element is a "cluster of flowers", and the original form is that flowers in the cluster of flowers all remain closed.

For example, in addition to displaying the first virtual object and the environmental virtual object in the virtual environment, the second client may display a picture in which the first virtual object moves to the environmental virtual object. In response to a movement operation that the first client controls the first virtual object to move to the environmental virtual object, a server synchronizes the movement operation to the second client. The second client displays the picture in which the first virtual object moves to the environmental virtual object.

Step 1240: Control the environmental virtual object to display a target form, the target form corresponding to a target skin that the first virtual object is fitted with.

In this disclosure, the target form is a form that is displayed by the environmental virtual object and that corresponds to the target skin that the first virtual object is fitted with. In an example, when the first virtual object is fitted with a first skin, the second client controls the environmental virtual object to display a first form corresponding to the first skin. When the first virtual object is fitted with a second skin, the second client controls the environmental virtual object to display a second form corresponding to the second skin. The first skin and the second skin are different skins. The first form and the second form are different forms of the environmental virtual object.

In an embodiment, the environmental virtual object is cloud. When the first virtual object is fitted with the first skin, the cloud is displayed by using a white map with high transparency. When the first virtual object is fitted with the second skin, the cloud is displayed by using a golden map with low transparency. The first skin and the second skin are different skins. Specific related discussions about that the first skin corresponds to the first form and the second skin corresponds to the second form have been made in the foregoing embodiments.

In an embodiment, the second client displays, by playing a first dynamic special effect, a form change process in which the original form of the environmental virtual object is switched to the target form and then the target form is switched to the original form. In an example, the scene element is a "tree", and the original form is a "dead tree", that is, there are no leaves on the tree. In this case, the second client switches the "dead tree" to a tree with leaves of a first density, and then switches the tree with the leaves of the first density to the "dead tree".

In summary, a new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, a display form of the environmental virtual object is highly correlated with a skin that the first virtual object is fitted with. This can improve interaction experience of a player, thereby increasing an interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an "Easter egg", and the environmental virtual object actively displays the target form to the first virtual object based on the target skin that the first virtual object is fitted with.

Figure 13:
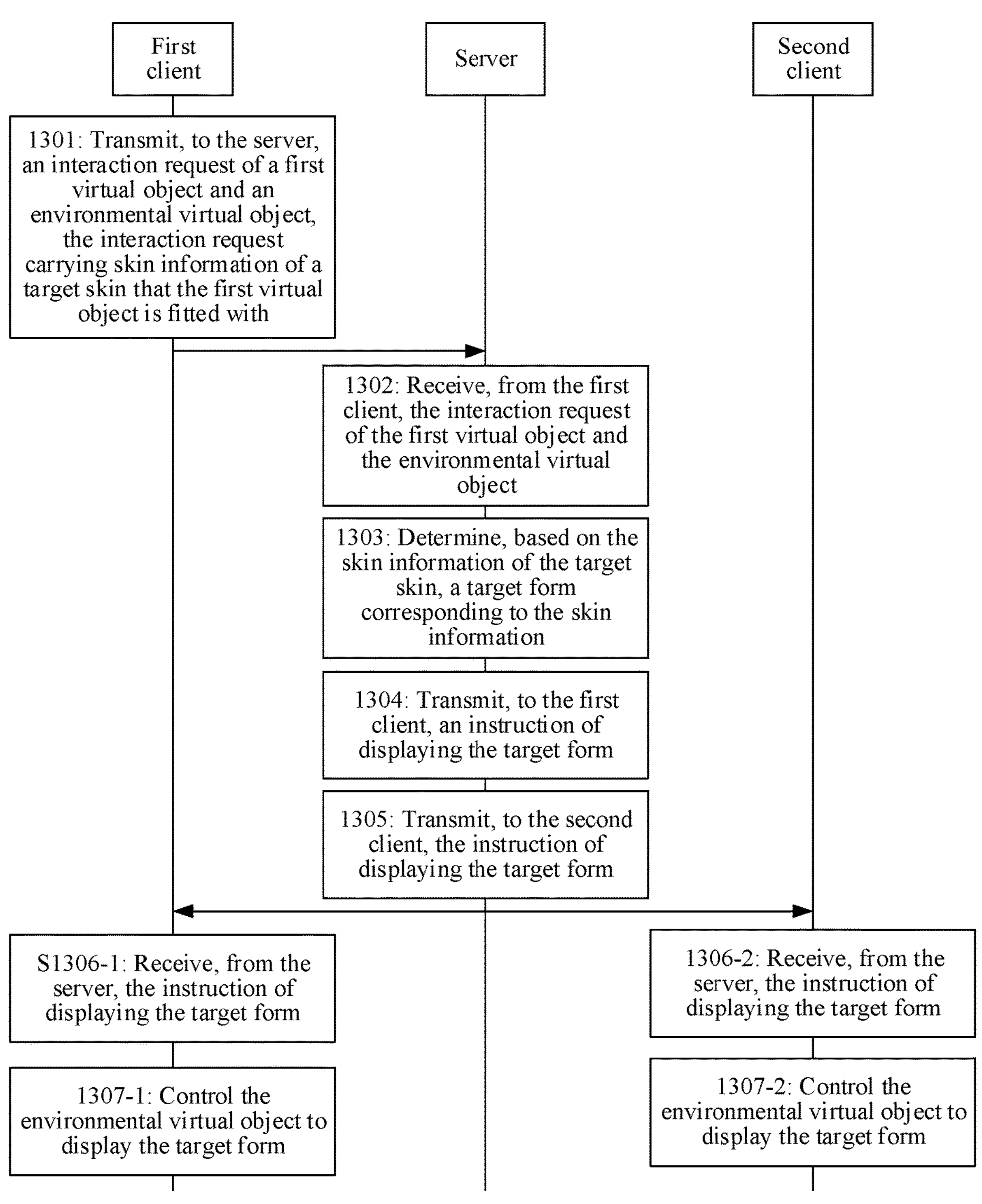
FIG. 13 is a schematic diagram of an interaction process of a computer system according to an exemplary embodiment.

FIG. 13 is a schematic diagram of an interaction process of a computer system according to another exemplary embodiment of this disclosure. The interaction process includes the following steps:

Step 1301: A first client transmits, to a server, an interaction request of a first virtual object and an environmental virtual object, the interaction request carrying skin information of a target skin that the first virtual object is fitted with.

The first client transmits, to the server in response to an interactive operation performed by the first virtual object on the environmental virtual object, the interaction request of the first virtual object and the environmental virtual object.

In an embodiment, the environmental virtual object on the first client and a second client displays an original form at an initial moment. The environmental virtual object on the first client and the second client displays a target form in response to the interactive operation performed by the first virtual object on the environmental virtual object. Then, the environmental virtual object on the first client and the second client displays the original form in response to that display duration of the target form reaches a threshold, until a next virtual object interacts with the environmental virtual object.

In an embodiment, the environmental virtual object on the first client and a second client displays a first form at an initial moment. The environmental virtual object on the first client and the second client displays a second form in response to the interactive operation performed by the first virtual object fitted with a second skin on the environmental virtual object. When another virtual object fitted with a third skin interacts with the environmental virtual object, the environmental virtual object on the first client and the second client displays a third form.

Step 1302: The server receives, from the first client, the interaction request of the first virtual object and the environmental virtual object.

The interaction request is generated based on the interactive operation performed by the first virtual object on the environmental virtual object and the skin information of the target skin that the first virtual object is fitted with.

Step 1303: The server determines, based on the skin information of the target skin, the target form corresponding to the skin information.

The server obtains the skin information of the target skin that the first virtual object is fitted with in the interaction request, and determines, based on the skin information of the target skin, the target form corresponding to the skin information.

For details, refer to detailed descriptions about step 1003 in the method embodiment shown in FIG. 10.

Step 1304: The server transmits, to the first client, an instruction of displaying the target form.

Step 1305: The server transmits, to the second client, the instruction of displaying the target form.

An execution sequence of step 1304 and step 1305 may be that step 1304 and step 1305 are performed at the same time, may be that step 1304 is performed prior to step 1305, or may be that step 1305 is performed prior to step 1304.

Step 1306-1: The first client receives, from the server, the instruction of displaying the target form.

Step 1307-1: The first client controls the environmental virtual object to display the target form.

Step 1306-2: The second client receives, from the server, the instruction of displaying the target form.

Step 1307-2: The second client controls the environmental virtual object to display the target form.

In summary, a manner in which the first client and the second client display the target form is provided based on interaction process between the first client, the second client, and the sever, and a correspondence process of the target skin and the target form is implemented at the server. This avoids a case that a player allows, by using a bug, the first client to still display the target form in a case that the first virtual object is not fitted with the target skin or that a player refuses, by using a bug, the second client to display the target form in a case that the first virtual object is fitted with the target skin. Therefore, interaction fairness of players is improved, interaction experience of the player is further improved, and an interaction rate between the player and the environmental virtual object is increased.

Figure 14:
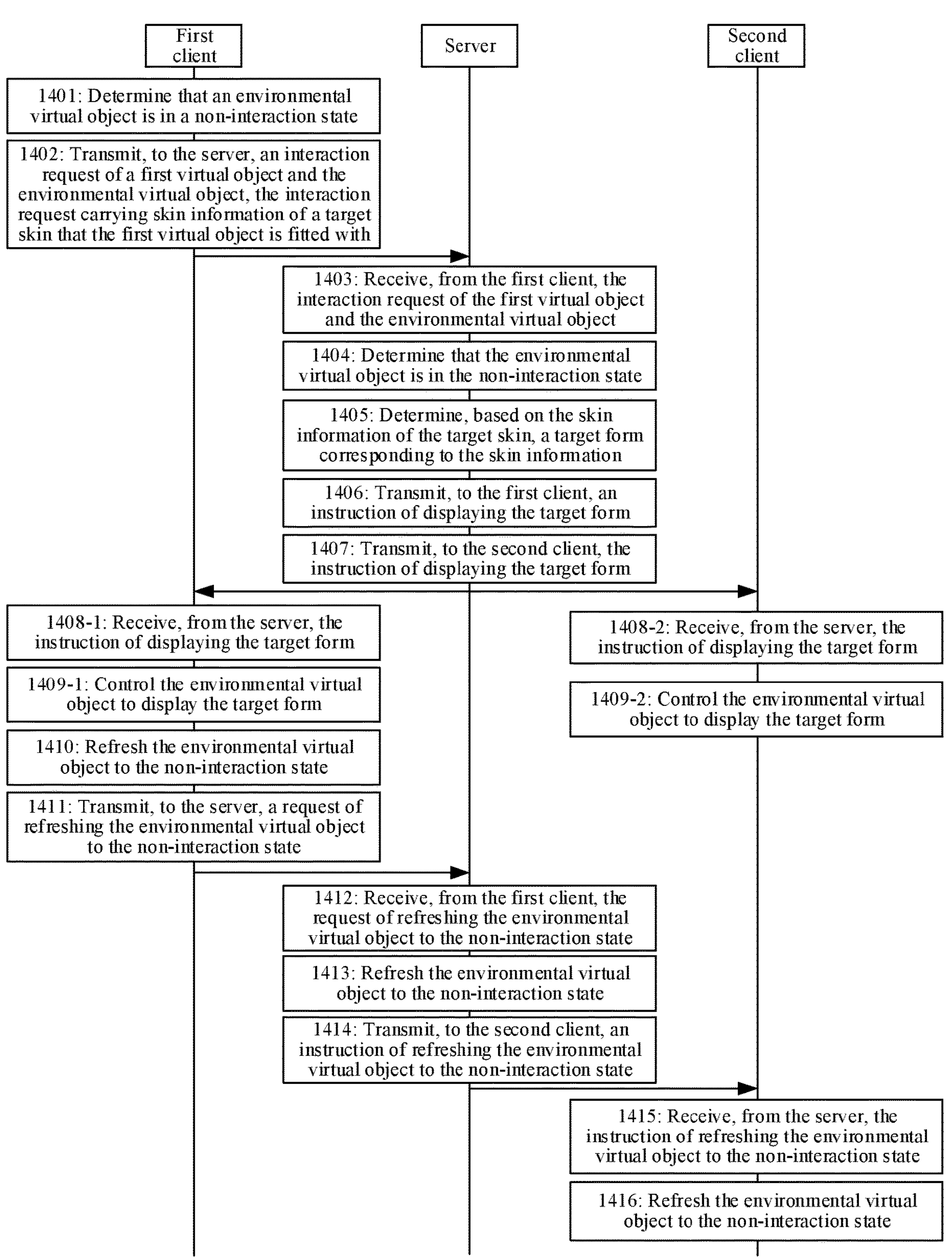
FIG. 14 is a schematic diagram of an interaction process of a computer system according to an exemplary embodiment.

FIG. 14 is a schematic diagram of an interaction process of a computer system according to another exemplary embodiment of this disclosure. The interaction process includes the following steps:

Step 1401: A first client determines that an environmental virtual object is in a non-interaction state.

The non-interaction state indicates that the environmental virtual object currently does not interact with a virtual object. The non-interaction state may also be referred to as an unused state. Every time when a status of the environmental virtual object is refreshed, a refreshed status needs to be synchronously updated to the first client, a server, and a second client.

The first client determines, in response to that the first client receives an interactive operation performed by a first virtual object on the environmental virtual object, that the environmental virtual object is currently in the non-interaction state.

Step 1402: The first client transmits, to the server, an interaction request of a first virtual object and the environmental virtual object, the interaction request carrying skin information of a target skin that the first virtual object is fitted with.

The interaction request is generated based on the interactive operation performed by the first virtual object on the environmental virtual object and the skin information of the target skin that the first virtual object is fitted with.

Step 1403: The server receives, from the first client, the interaction request of the first virtual object and the environmental virtual object.

The interaction request is generated based on the interactive operation performed by the first virtual object on the environmental virtual object and the skin information of the target skin that the first virtual object is fitted with.

Step 1404: The server determines that the environmental virtual object is in the non-interaction state.

The server rechecks whether the environmental virtual object is in the non-interaction state. If the environmental virtual object is in the non-interaction state, the server performs step 1405.

Step 1405: The server determines, based on the skin information of the target skin, a target form corresponding to the skin information.

The server obtains the skin information of the target skin that the first virtual object is fitted with in the interaction request, and determines, based on the skin information of the target skin, the target form corresponding to the skin information.

For details, refer to detailed descriptions about step 1003 in the method embodiment shown in FIG. 10.

Step 1406: The server transmits, to the first client, an instruction of displaying the target form.

The server transmits, to the first client, the instruction of controlling the environmental virtual object to display the target form.

Step 1407: The server transmits, to the second client, the instruction of displaying the target form.

The server transmits, to the second client, the instruction of controlling the environmental virtual object to display the target form.

An execution sequence of step 1406 and step 1407 may be that step 1406 and step 1407 are performed at the same time, may be that step 1406 is performed prior to step 1407, or may be that step 1407 is performed prior to step 1406.

Step 1408-1: The first client receives, from the server, the instruction of displaying the target form.

Step 1409-1: The first client controls the environmental virtual object to display the target form.

Step 1408-2: The second client receives, from the server, the instruction of displaying the target form.

Step 1409-2: The second client controls the environmental virtual object to display the target form.

In an embodiment, the first client displays, by playing a first dynamic special effect, a form change process in which an original form of the environmental virtual object is switched to the target form and then the target form is switched to the original form. After completing playing the first dynamic special effect, the first client refreshes the environmental virtual object to the non-interaction state.

Step 1410: The first client refreshes the environmental virtual object to the non-interaction state.

Step 1411: The first client transmits, to the server, a request of refreshing the environmental virtual object to the non-interaction state.

Step 1412: The server receives, from the first client, the request of refreshing the environmental virtual object to the non-interaction state.

Step 1413: The server refreshes the environmental virtual object to the non-interaction state.

Step 1414: The server transmits, to the second client, an instruction of refreshing the environmental virtual object to the non-interaction state.

Step 1415: The second client receives, from the server, the instruction of refreshing the environmental virtual object to the non-interaction state.

Step 1416: The second client refreshes the environmental virtual object to the non-interaction state.

In summary, it is set that the first client, the second client, and the server need to synchronously update an interaction state of the environmental virtual object. This ensures that the environmental virtual object allows a virtual object controlled by only one player to interact with the environmental virtual object at the same time, and further ensures that a plurality of clients synchronously display the target form. Therefore, a display error caused by the fact that a plurality of players control virtual objects to interact with a same environmental virtual object at the same time may be avoided, display correctness of a form of the environmental virtual object may be improved, interaction experience of the player may be improved, and an interaction rate between the player and the environmental virtual object may be further improved.

Figures 15, 16, 17:
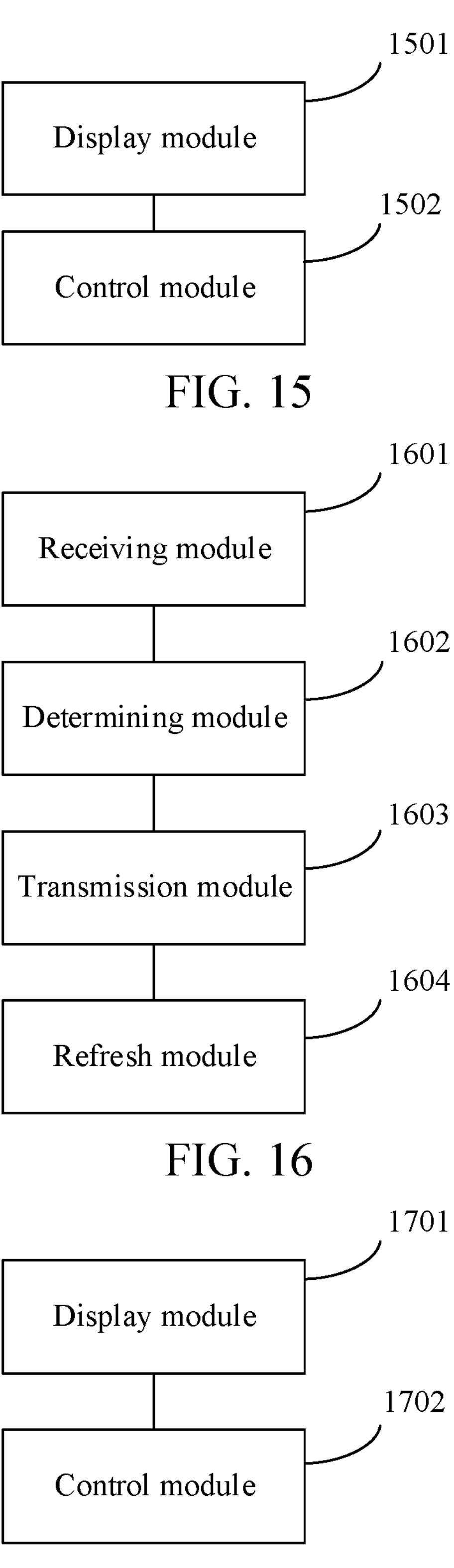
FIG. 15 is a block diagram of a structure of a virtual-environment-based interaction apparatus according to an exemplary embodiment.
FIG. 16 is a block diagram of a structure of a virtual-environment-based interaction apparatus according to another exemplary embodiment.
FIG. 17 is a block diagram of a structure of a virtual-environment-based interaction apparatus according to another exemplary embodiment.

FIG. 15 is a block diagram of a structure of a virtual-environment-based interaction apparatus according to an exemplary embodiment of this disclosure. The apparatus includes: a display module 1501, configured to display a first virtual object and an environmental virtual object in a virtual environment, the environmental virtual object being a scene element that the virtual environment has; and a control module 1502, configured to control, in response to an interactive operation performed by the first virtual object on the environmental virtual object, the environmental virtual object to display a target form, the target form corresponding to a target skin that the first virtual object is fitted with.

In an embodiment, the control module 1502 is further configured to control, in a case that the first virtual object is fitted with a first skin, the environmental virtual object to display a first form corresponding to the first skin.

In an embodiment, the control module 1502 is further configured to control, in a case that the first virtual object is fitted with a second skin, the environmental virtual object to display a second form corresponding to the second skin.

In an embodiment, the first skin and the second skin are different skins. The first form and the second form are different forms of the environmental virtual object.

In an embodiment, the first skin and the second skin are skins of different levels of a same skin series. Skins in the same skin series are of a same basic skin style. A level of the first skin is lower than that of the second skin. Fineness of the first form is lower than that of the second form.

In an embodiment, the first skin and the second skin are different in rarity. Rarity of the first skin is lower than that of the second skin. Fineness of the first form is lower than that of the second form.

In an embodiment, the first skin and the second skin are different in skin quality. Skin quality of the first skin is lower than that of the second skin. Fineness of the first form is lower than that of the second form.

In an embodiment, the first skin and the second skin belong to different skin themes. The first skin belongs to a first skin theme. The second skin belongs to a second skin theme. A style of the first form corresponds to the first skin theme. A style of the second form corresponds to the second skin theme.

In an embodiment, the first skin and the second skin cover different body parts of the first virtual object. A body part of the first virtual object covered by the first skin is a first body part. A body part of the first virtual object covered by the second skin is a second body part. The first form includes that fineness of a first body part of the environmental virtual object is higher than that of a body part other than the first body part. The second form includes that fineness of a second body part of the environmental virtual object is higher than that of a body part other than the second body part.

In an embodiment, the first skin and the second skin have different skin accessories. The first skin has a first skin accessory. The second skin has a second skin accessory. The first form includes that the first skin accessory is displayed on the environmental virtual object. The second form includes that the second skin accessory is displayed on the environmental virtual object.

In an embodiment, the first skin and the second skin have different skin attributes. The first form includes that the environmental virtual object has a display element corresponding to a skin attribute of the first skin. The second form includes that the environmental virtual object has a display element corresponding to a skin attribute of the second skin.

In an embodiment, quantities of skin accessories of the first skin and the second skin are different. The quantity of skin accessories of the first skin is less than that of skin accessories of the second skin. Fineness of the first form is lower than that of the second form, and/or, display duration of the first form is less than that of the second form.

In an embodiment, the environmental virtual object includes all or some environmental virtual objects within a reference distance range of the first virtual object. The interactive operation acts on at least one of all or some environmental virtual objects. The reference distance range corresponds to the target skin that the first virtual object is fitted with.

In an embodiment, the display module 1501 is further configured to display the environmental virtual object in an original form. The original form is a basic form of the environmental virtual object.

In an embodiment, the control module 1502 is further configured to display, by playing a first dynamic special effect, a form change process in which an original form of the environmental virtual object is switched to the target form and then the target form is switched to the original form.

In an embodiment, the control module 1502 is further configured to transmit, to a server, an interaction request of the first virtual object and the environmental virtual object. The interaction request carries skin information of the target skin that the first virtual object is fitted with.

In an embodiment, the control module 1502 is further configured to receive, from a server, an instruction of displaying the target form.

In an embodiment, the control module 1502 is further configured to control the environmental virtual object to display the target form.

In an embodiment, the control module 1502 is further configured to determine that the environmental virtual object is in a non-interaction state. The non-interaction state indicates that the environmental virtual object currently does not interact with a virtual object.

In an embodiment, the control module 1502 is further configured to refresh the environmental virtual object to a non-interaction state. The non-interaction state indicates that the environmental virtual object currently does not interact with a virtual object.

In an embodiment, the control module 1502 is further configured to transmit, to the server, a request of refreshing the environmental virtual object to the non-interaction state.

In summary, a new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, a display form of the environmental virtual object is highly correlated with a skin that the first virtual object is fitted with. This can improve interaction experience of a player, thereby increasing an interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an "Easter egg", and the environmental virtual object actively displays the target form to the first virtual object based on the target skin that the first virtual object is fitted with.

FIG. 16 is a block diagram of a structure of a virtual-environment-based interaction apparatus according to an exemplary embodiment of this disclosure. The apparatus includes:

- a receiving module 1601, configured to receive, from a first client, an interaction request of a first virtual object and an environmental virtual object, the interaction request carrying skin information of a target skin that the first virtual object is fitted with;
- a determining module 1602, configured to determine, based on the skin information of the target skin, a target form corresponding to the skin information; and
- a transmission module 1603, configured to transmit, to the first client, an instruction of displaying the target form.

The first client is a client configured to control the first virtual object. The environmental virtual object is a scene element that a virtual environment has.

In an embodiment, the skin information includes at least one of the following: a skin level of the target skin in a target skin series to which the target skin belongs, skins in the target skin series being of a same basic skin style; rarity of the target skin; skin quality of the target skin; a skin theme of the target skin; a body part of the first virtual object covered by the target skin; a skin accessory of the target skin; a skin attribute of the target skin; and a quantity of skin accessories of the target skin.

In an embodiment, the determining module 1602 is further configured to determine that the environmental virtual object is in a non-interaction state. The non-interaction state indicates that the environmental virtual object currently does not interact with a virtual object.

In an embodiment, the receiving module 1601 is further configured to receive, from the first client, a request of refreshing the environmental virtual object to a non-interaction state. The non-interaction state indicates that the environmental virtual object currently does not interact with a virtual object.

In an embodiment, the apparatus further includes a refresh module 1604. The refresh module 1604 is configured to refresh the environmental virtual object to the non-interaction state.

In an embodiment, the transmission module 1603 is further configured to transmit, to a second client, an instruction of displaying the target form. The second client is a client configured to control a second virtual object. The second virtual object is any virtual object other than the first virtual object in the virtual environment.

In an embodiment, the transmission module 1603 is further configured to transmit, to a second client, an instruction of refreshing the environmental virtual object to a non-interaction state, The second client is a client configured to control a second virtual object. The second virtual object is any virtual object other than the first virtual object in the virtual environment. The non-interaction state indicates that the environmental virtual object currently does not interact with a virtual object.

In summary, a new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, a display form of the environmental virtual object is highly correlated with a skin that the first virtual object is fitted with. This can improve interaction experience of a player, thereby increasing an interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an "Easter egg", and the environmental virtual object actively displays the target form to the first virtual object based on the target skin that the first virtual object is fitted with.

FIG. 17 is a block diagram of a structure of a virtual-environment-based interaction apparatus according to an exemplary embodiment of this disclosure. The apparatus includes:

- a display module 1701, configured to display a first virtual object and an environmental virtual object in a virtual environment, the environmental virtual object being a scene element that the virtual environment has; and
- a control module 1702, configured to control the environmental virtual object to display a target form, the target form corresponding to a target skin that the first virtual object is fitted with.

In an embodiment, the display module 1701 is further configured to display a picture in which the first virtual object moves to the environmental virtual object.

In an embodiment, the control module 1702 is further configured to control, in a case that the first virtual object is fitted with a first skin, the environmental virtual object to display a first form corresponding to the first skin.

In an embodiment, the control module 1702 is further configured to control, in a case that the first virtual object is fitted with a second skin, the environmental virtual object to display a second form corresponding to the second skin.

The first skin and the second skin are different skins. The first form and the second form are different forms of the environmental virtual object.

In an embodiment, the display module 1701 is further configured to display the environmental virtual object in an original form. The original form is a basic form of the environmental virtual object.

In an embodiment, the control module 1702 is further configured to display, by playing a first dynamic special effect, a form change process in which an original form of the environmental virtual object is switched to the target form and then the target form is switched to the original form.

In an embodiment, the control module 1702 is further configured to receive, from a server, an instruction of displaying the target form.

In an embodiment, the control module 1702 is further configured to control the environmental virtual object to display the target form.

In an embodiment, the control module 1702 is further configured to receive, from a server, an instruction of refreshing the environmental virtual object to a non-interaction state.

In an embodiment, the control module 1702 is further configured to refresh the environmental virtual object to the non-interaction state. The non-interaction state indicates that the environmental virtual object currently does not interact with a virtual object.

In summary, a new interaction manner is provided for the environmental virtual object and the first virtual object by displaying, on the environmental virtual object, the target form corresponding to the target skin that the first virtual object is fitted with. Therefore, interaction manners between the environmental virtual object and the first virtual object are enriched. In this new interaction manner, a display form of the environmental virtual object is highly correlated with a skin that the first virtual object is fitted with. This can improve interaction experience of a player, thereby increasing an interaction rate between the player and the environmental virtual object.

In the related art, interaction between the environmental virtual object and the first virtual object is determined based on a behavior of the first virtual object, for example, the first virtual object picks a fruit in a tree, or the first virtual object forges a weapon by using a forging furnace. In the related art, interaction is completed only based on a behavior actively performed by the first virtual object on the environmental virtual object. In this disclosure, interaction between the first virtual object and the environmental virtual object is provided in a manner like an "Easter egg", and the environmental virtual object actively displays the target form to the first virtual object based on the target skin that the first virtual object is fitted with.

Figure 18:
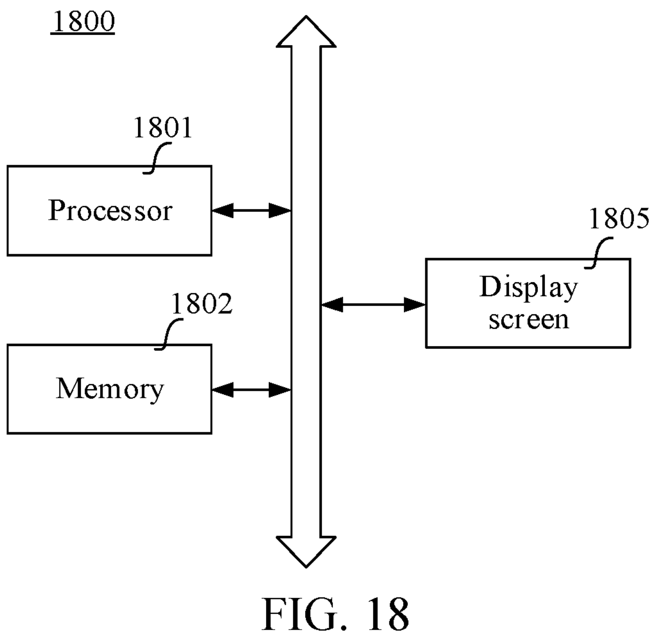
FIG. 18 is a block diagram of a structure of a computer device according to an exemplary embodiment.

FIG. 18 is a block diagram of a structure of a computer device 1800 according to an exemplary embodiment of this disclosure. The computer device 1800 may be a portable mobile terminal, for example, a smartphone, a tablet computer, an MP3 player, an MP4 player, a notebook computer, or a desktop computer. The computer device 1800 may also be referred to as user equipment, a portable terminal, a laptop terminal, a desktop terminal, or another name.

The computer device 1800 usually includes a processor 1801 and a memory 1802.

The processor 1801 may include one or more processing cores, for example, a 4-core processor or an 8-core processor. The processor 1801 may be implemented in at least one hardware form of a digital signal processor (DSP), a field-programmable gate array (FPGA), and a programmable logic array (PLA). Alternatively, the processor 1801 may include a main processor and a co-processor. The main processor is a processor configured to process data in an awake state, and is also referred to as a central processing unit (CPU). The co-processor is a low-power processor configured to process data in a standby state. In some embodiments, the processor 1801 may be integrated with a graphics processing unit (GPU) that is configured to render and draw content that a display screen needs to display. In some embodiments, the processor 1801 may alternatively include an artificial intelligence (AI) processor. The AI processor is configured to process computing operations related to machine learning.

The memory 1802 may include one or more computer-readable storage media. The computer-readable storage medium may be non-transitory. The memory 1802 may further include a high-speed random access memory and a non-volatile memory, for example, one or more disk storage devices or flash storage devices. In some embodiments, the non-transitory computer-readable storage medium in the memory 1802 is configured to store at least one instruction. The at least one instruction is used to be executed by the processor 1801 to implement the virtual-environment-based interaction method provided in the method embodiment in this disclosure.

In some embodiments, the computer device 1800 further includes a display screen 1805.

The display screen 1805 is configured to display a UI. The UI may include a graph, text, an icon, a video, and any combination thereof. When the display screen 1805 is a touch display screen, the display screen 1805 further has a capability of acquiring a touch signal on or above a surface of the display screen 1805. The touch signal may be input to the processor 1801 as a control signal for processing. In this case, the display screen 1805 may be further configured to provide a virtual button and/or a virtual keyboard that are/is also referred to as a soft button and/or a soft keyboard. In some embodiments, the display screen 1805 may be a flexible display screen disposed on a curved surface or a folded surface of the computer device 1800. The display screen 1805 may even be further set in a non-rectangular irregular pattern, that is, a special-shaped screen. The display screen 1805 may be prepared from a material such as a liquid crystal display (LCD) or an organic light-emitting diode (OLED). For example, the first virtual object, the environmental virtual object, and the like are displayed through the display screen 1805.

It may be understood by a person skilled in the art that the structure shown in FIG. 18 does not form a limitation on the computer device 1800. More or fewer components than those shown in the figure may be included, or some components are combined, or different component arrangements are used.

This disclosure also provides a computer-readable storage medium. The storage medium stores at least one instruction, at least one piece of program, a code set, or an instruction set. The at least one instruction, the at least one piece of program, the code set, or the instruction set is loaded and executed by a processor to implement the virtual-environment-based interaction method provided in the foregoing method embodiment.

This disclosure provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the virtual-environment-based interaction method provided in the foregoing method embodiment.

The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

It may be understood by a person of ordinary skill in the art that all or some steps in the foregoing embodiments may be completed by using hardware, or by using a program instructing related hardware. The program may be stored in a computer-readable storage medium. The storage medium may be a read-only memory, a magnetic disk, an optical disk, or the like.

The foregoing descriptions are merely exemplary embodiments of this disclosure, but are not intended to limit this disclosure. Any modification, equivalent replacement, improvement, or the like made within the principle of this disclosure shall fall within the protection scope of this disclosure.

What is claimed is:

1. A method for displaying virtual objects, the method comprising:

displaying a first virtual object and an environmental virtual object in a virtual scene of an application program;

receiving, via a user input interface, a user input to control the first virtual object to interact with the environmental virtual object in the virtual scene of the application program; and controlling, by processing circuitry and based on an interaction with the environmental virtual object by the first virtual object and a skin of the first virtual object that is one of a plurality of skins, the display of the environmental virtual object to change to a target form, the target form being determined according to the skin of the first virtual object, wherein the controlling includes controlling the display, by playing a first dynamic special effect, of a form change process in which an initial form of the environmental virtual object switches to the target form and subsequently the target form switches to the initial form of the environmental virtual object, the initial form of the environmental virtual object being independent from the skin of the first virtual object, the skin of the first virtual object is configured to change among the plurality of skins, the target form of the environmental virtual object changes with the skin of the first virtual object, the target form of the environmental virtual object changes to a first target form when the skin of the first virtual object is a first skin of the plurality of skins, and the target form of the environmental virtual object changes to a second target form when the skin of the first virtual object is a second skin of the plurality of skins, the first skin and the second skin being different, and the first target form and the second target form being different.

2. The method according to claim 1, wherein the skin of the first virtual object changes an appearance of the first virtual object.

3. The method according to claim 2, wherein the controlling comprises:

controlling, based on the one of the plurality of skins being the first skin of the plurality of skins, the display of the environmental virtual object to change to the target form that is the first target form corresponding to the first skin; and controlling, based on the one of the plurality of skins being the second skin of the plurality of skins, the display of the environmental virtual object to change to the target form that is the second target form corresponding to the second skin.

4. The method according to claim 3, wherein the first skin and the second skin are of different levels of a same skin series, and each of the same skin series has a respective basic skin style;

a level of the first skin is lower than a level of the second skin; and detail of the first target form is lower than detail of the second target form.

5. The method according to claim 3, wherein the first skin is less rare than the second skin, indicating that the first skin is easier to obtain than the second skin; and detail of the first target form is lower than detail of the second target form.

6. The method according to claim 3, wherein skin quality of the first skin is lower than skin quality of the second skin; and detail of the first target form is lower than detail of the second target form.

7. The method according to claim 3, wherein the first skin is associated with a first skin theme, the second skin is associated with a second skin theme that is different from the first skin theme, a style of the first target form corresponds to the first skin theme, and a style of the second target form corresponds to the second skin theme.

8. The method according to claim 3, wherein the first skin and the second skin change the appearance of different body parts of the first virtual object; and detail of a first body part of the first virtual object is higher than detail of another body part of the first virtual object other than the first body part in the first target form, and detail of a second body part of the first virtual object is higher than detail of another body part of the first virtual object other than the second body part in the second target form.

9. The method according to claim 3, wherein the first skin includes a first accessory and the second skin includes a second accessory; and the first accessory is displayed on the environmental virtual object in the first target form and the second accessory is displayed on the environmental virtual object in the second target form.

10. The method according to claim 3, wherein the first skin has a first attribute and the second skin has a second attribute;

the environmental virtual object has a display element corresponding to the first attribute of the first skin in the first target form; and the environmental virtual object has a display element corresponding to the second attribute of the second skin in the second target form.

11. The method according to claim 3, wherein a quantity of skin accessories of the first skin is less than a quantity of skin accessories of the second skin; and at least one of detail of the first target form is lower than detail of the second target form or a display duration of the first target form is less than a display duration of the second target form.

12. The method according to claim 1, wherein the virtual scene includes a plurality of environmental virtual objects within a reference distance range of the first virtual object;

the environmental virtual object is one of the plurality of environmental virtual objects; and the first virtual object interacts with one or more of the plurality of environmental virtual objects.

13. The method according to claim 1, further comprising:

displaying the environmental virtual object in the initial form, the initial form being a basic form of the environmental virtual object.

14. The method according to claim 1, wherein the controlling comprises:

sending, to a server, an interaction request of the first virtual object with the environmental virtual object, the interaction request including skin information of the skin of the first virtual object;

receiving, from the server, target form information of the target form; and controlling the display of the environmental virtual object to change to the target form based on the target form information.

15. The method according to claim 14, wherein the method further comprises:

determining that the environmental virtual object is in a non-interaction state based on an interactive operation being performed by the first virtual object on the environmental virtual object.

16. The method according to claim 1, wherein the target form switches to the initial form based on a display duration of the target form reaching a threshold.

17. A method for displaying virtual objects, the method comprising:

receiving, by a server, an interaction request of a first virtual object with an environmental virtual object in a virtual scene of an application program from a client device, the interaction request including skin information of a skin of the first virtual object;

determining, by the server and based on the skin information of the skin, a target form of the environmental virtual object that corresponds to the skin indicated by the skin information, the target form being determined according to the skin of the first virtual object that is one of a plurality of skins; and sending, from the server to the client device, target form information that indicates the determined target form of the environmental virtual object to be displayed by the client device, wherein the target form information is associated with a form change process in which an initial form of the environmental virtual object switches to the target form and subsequently the target form switches to the initial form of the environmental virtual object, the initial form of the environmental virtual object being independent from the skin of the first virtual object, the skin of the first virtual object is configured to change among the plurality of skins, the target form of the environmental virtual object changes with the skin of the first virtual object, the target form of the environmental virtual object changes to a first target form when the skin of the first virtual object is a first skin of the plurality of skins, and the target form of the environmental virtual object changes to a second target form when the skin of the first virtual object is a second skin of the plurality of skins, the first skin and the second skin being different, and the first target form and the second target form being different.

18. The method according to claim 17, wherein the skin changes an appearance of the first virtual object.

19. The method according to claim 18, wherein the skin information indicates at least one of:

a skin level of the skin in a target skin series, skins in the target skin series having a same basic skin style;

rarity of the skin;

skin quality of the skin;

a skin theme of the skin;

a body part of the first virtual object changed by the skin;

a skin accessory of the skin;

a skin attribute of the skin; and a quantity of skin accessories of the skin.

20. An information processing apparatus, comprising:

processing circuitry configured to:

display a first virtual object and an environmental virtual object in a virtual scene of an application program;

receive, via a user input interface, a user input to control the first virtual object to interact with the environmental virtual object in the virtual scene of the application program; and control, based on an interaction with the environmental virtual object by the first virtual object and a skin of the first virtual object that is one of a plurality of skins, the display of the environmental virtual object to change to a target form, the target form being determined according to the skin of the first virtual object, wherein a form change process is displayed in which an initial form of the environmental virtual object switches to the target form and subsequently the target form switches to the initial form of the environmental virtual object, the initial form of the environmental virtual object being independent from the skin of the first virtual object, the skin of the first virtual object is configured to change among the plurality of skins, the target form of the environmental virtual object changes with the skin of the first virtual object, the target form of the environmental virtual object changes to a first target form when the skin of the first virtual object is a first skin of the plurality of skins, and the target form of the environmental virtual object changes to a second target form when the skin of the first virtual object is a second skin of the plurality of skins, the first skin and the second skin being different, and the first target form and the second target form being different.

* * * * *